US008564577B2

(12) United States Patent  (10) Patent No.: US 8,564,577 B2
Takei  (45) Date of Patent: Oct. 22, 2013

(54) DISPLAY APPARATUS, DRIVE CONTROL METHOD OF DISPLAY APPARATUS AND MANUFACTURING METHOD OF DISPLAY APPARATUS

(75) Inventor: Manabu Takei, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 733 days.

(21) Appl. No.: 12/748,834

(22) Filed: Mar. 29, 2010

(65) Prior Publication Data

US 2010/0245308 A1   Sep. 30, 2010

(30) Foreign Application Priority Data

Mar. 30, 2009  (JP) ................................. 2009-081043

(51) Int. Cl.
*G06F 3/038*  (2013.01)
*G09G 5/00*  (2006.01)
*G09G 3/36*  (2006.01)
*G06F 3/041*  (2006.01)

(52) U.S. Cl.
USPC ............ 345/206; 345/104; 345/173; 345/204

(58) Field of Classification Search
USPC ......................................................... 345/206
See application file for complete search history.

(56) References Cited

FOREIGN PATENT DOCUMENTS

JP  2001-183630 A  7/2001
JP  2008-158911 A  7/2008

OTHER PUBLICATIONS

Japanese Office Action dated Jun. 22, 2011 (and English translation thereof) in counterpart Japanese Application No. 2009-081043.

*Primary Examiner* — Charles V Hicks
(74) *Attorney, Agent, or Firm* — Holtz, Holtz, Goodman & Chick, PC

(57) ABSTRACT

Disclosed is a display apparatus including a plurality of display pixels formed of a plurality of first electrodes provided in one surface side of a substrate, a second electrode which faces each of the first electrodes and display functional layers which are provided between each of the first electrodes and the second electrode and a resistive film having a predetermined resistivity in which one surface side is provided so as to face the other surface side of the second electrode having a predetermined space above the upper surface of a partition wall layer to define a forming region for each of the display pixels and which is disposed so as to be conductive to the other surface side of the second electrode by a pressure applied from outside, and the second electrode constructing the display pixels is double used as an electrode for detecting a position where the pressure is applied.

15 Claims, 16 Drawing Sheets

(VISUAL FIELD SIDE)

VA-VA CROSS-SECTION

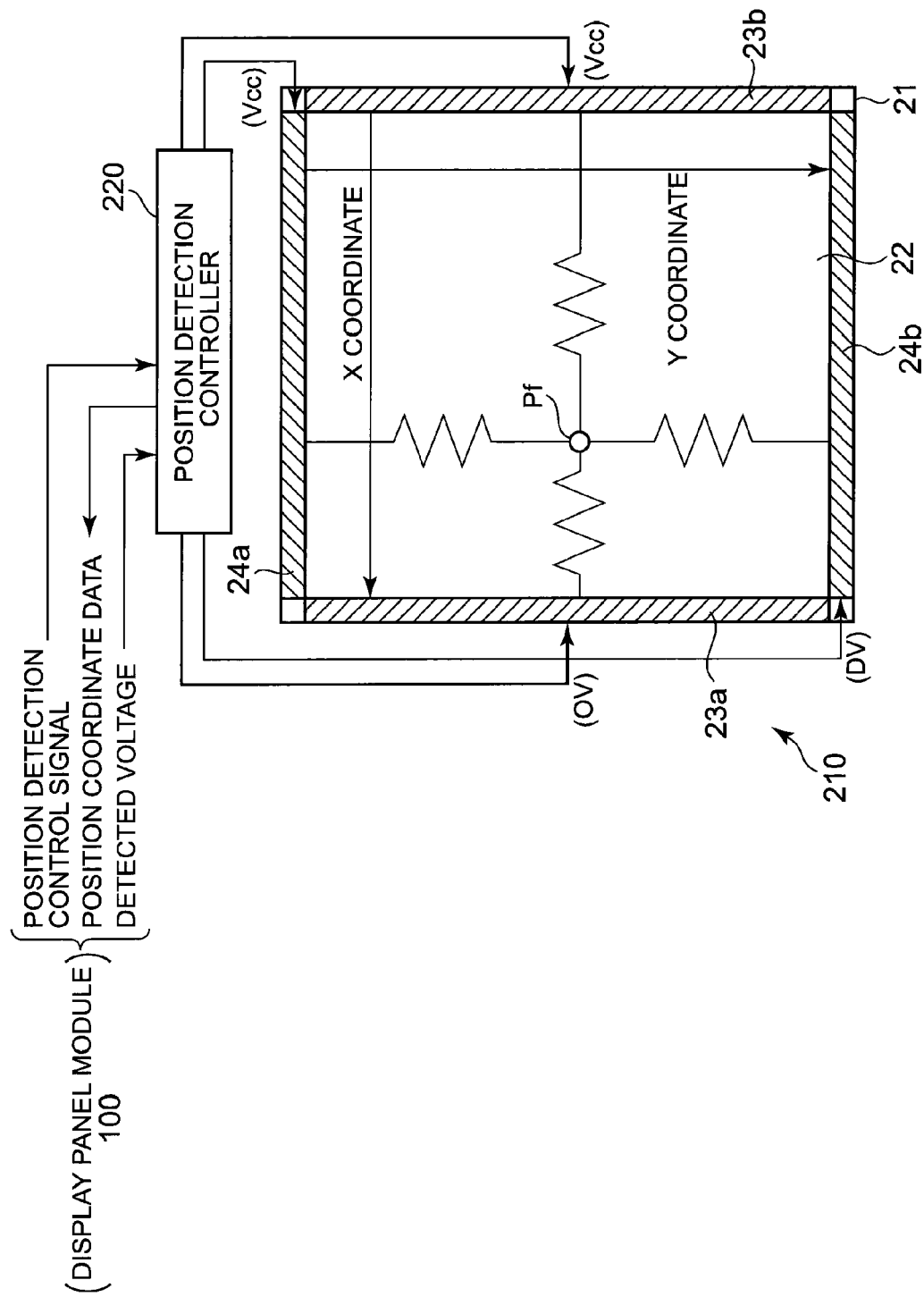

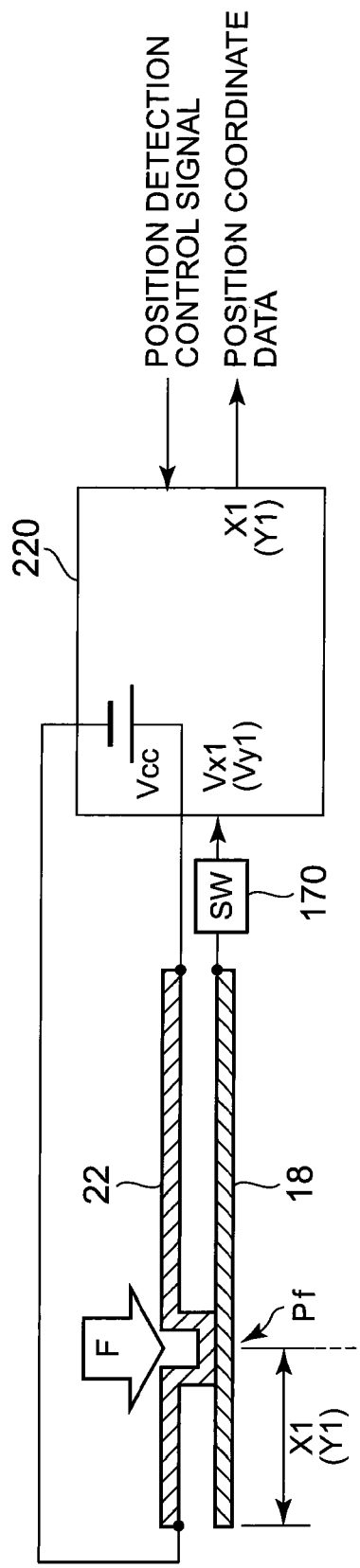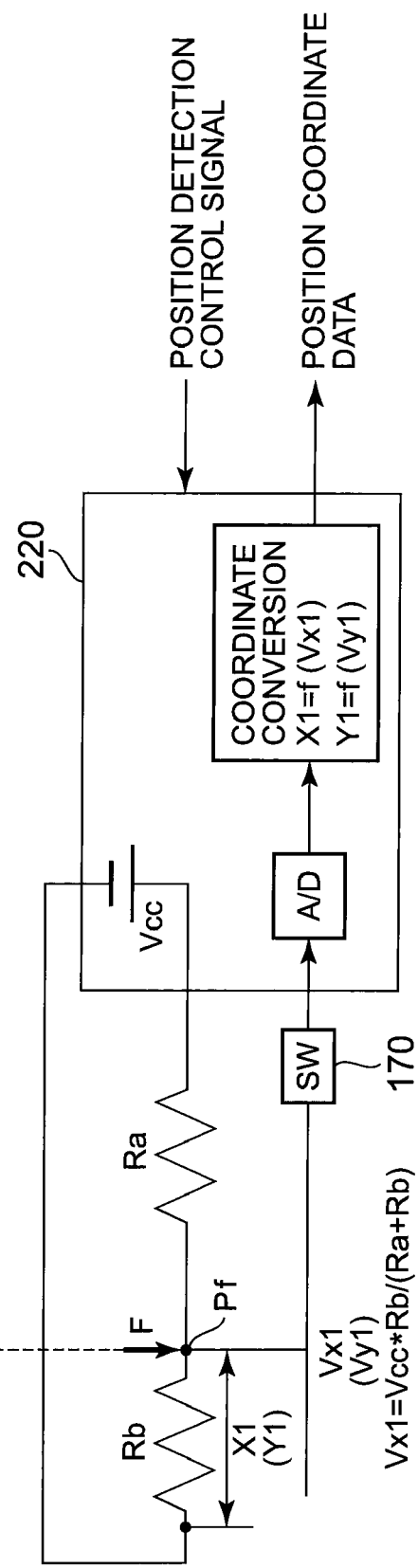

(VISUAL FIELD SIDE)

(VISUAL FIELD SIDE)

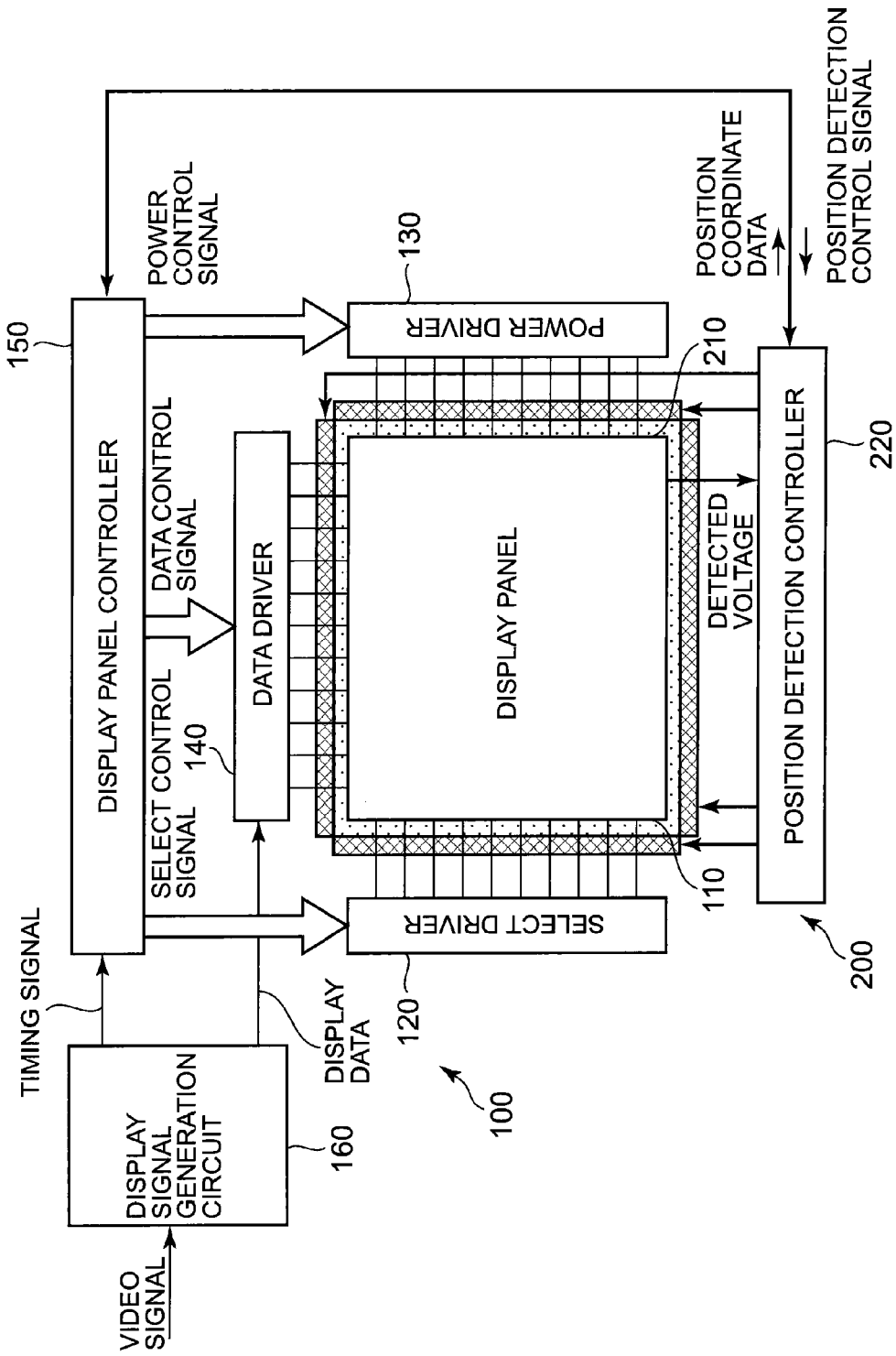

DISPLAY APPARATUS, DRIVE CONTROL METHOD OF DISPLAY APPARATUS AND MANUFACTURING METHOD OF DISPLAY APPARATUS

BACKGROUND OF THE INVENTION

1. Field of the Invention

The present invention relates to a display apparatus, a drive control method thereof and a manufacturing method thereof. In particular, the present invention relates to a display apparatus comprising a touch panel function, a drive control method thereof and a manufacturing method thereof.

2. Description of the Related Art

Conventionally, a display apparatus which comprises a touch panel function to select operation and to input information by a user directly touching a display screen is used in car navigation systems, automated teller machines (ATM), some personal computers and the like. In recent years, cell phones, portable music players, digital cameras, electronic dictionaries and the like which comprise a touch panel function are being commercialized.

Meanwhile, as a display panel to be applied to the display apparatus comprising such function, conventionally, a liquid crystal display (LCD) panel has been used. In recent years, organic electroluminescence (hereinafter, abbreviated as "organic EL") display panel which can be made thinner and which can carry out high quality video display based on high chroma and fast response is drawing attention.

As it is well knows, the organic EL display panel has a panel structure in which a plurality of organic EL elements are arranged in two-dimensional array on one surface side of a glass substrate or the like, for example. An organic EL element has an element structure where an anode (positive pole) electrode, an organic EL layer (light emitting function layer) and a cathode (negative pole) electrode are orderly laminated. By applying voltage between an anode electrode and a cathode electrode so that an organic EL layer exceeds light emitting threshold, light (excitation light) is emitted based on energy generated when holes and electrons which are injected recombine in the organic EL layer.

A display apparatus comprising a touch panel function in a liquid crystal display panel or in an organic EL display panel is disclosed in JP 2008-158911, for example. Here, a structure where a transparent touch panel is disposed in a visual field side of the liquid crystal display panel or the organic EL display panel is described. Further, as for the touch panel function, various types of methods such as a resistive film method, an electrostatic capacity method and the like are known.

The display apparatus comprising a touch panel function such as the one shown in the above mentioned JP 2008-158911 has a structure where a touch panel of a resistive film type is disposed in a visual field side of a liquid crystal display panel or an organic EL display panel, the touch panel being a different structure from the display panel.

In such structure, image information which is displayed in the display panel is visually acknowledged by a user via a transparent member which constructs the touch panel. Therefore, there is a case where display quality is degraded due to contrast being reduced by reflection of external light, attenuation of transmitted light and the like.

Moreover, the display panel and the touch panel which are different parts manufactured individually need to be assembled. Therefore, component cost increases and manufacturing process increases, and also, mounting footprints and thickness of the display apparatus increase.

A structure example of a display apparatus comprising a touch panel function according to the prior art will be described in detail in the after mentioned embodiment.

SUMMARY OF THE INVENTION

According to the present invention, a display apparatus comprising a touch panel function which can realize a good display quality by inhibiting the contrast from being reduced, which can reduce the manufacturing cost and which can make the apparatus be smaller and thinner and a manufacturing method thereof can be provided.

To obtain the above advantage, a display apparatus according to a first aspect of the present invention comprises a display panel which comprises a plurality of display pixels and a partition wall layer (16), the plurality of display pixels are arranged in a two-dimensional array in one surface side of a first substrate which are formed of a plurality of first electrodes provided in the one surface side of the first substrate, a second electrode in which one surface side thereof faces each of the first electrodes and display functional layers which are provided between each of the first electrodes and the second electrode and the partition wall layer is disposed to define a forming region for each of the plurality of display pixels; and a resistive film which has a predetermined resistivity and which is provided so that one surface side thereof faces the other surface side of the second electrode, and the second electrode is disposed so as to face the plurality of first electrodes including an upper surface of the partition wall layer, and the resistive film is provided so as to face the other surface side of the second electrode via a predetermined space above the upper surface side of the partition wall layer and is disposed so as to be conductive to the other surface side of the second electrode by a pressure applied from an outside.

To obtain the above advantage, a display apparatus according to a second aspect of the present invention comprises a display panel which comprises a plurality of display pixels and a partition wall layer, the plurality of display pixels are arranged in a two-dimensional array in one surface side of a first substrate which are formed of a plurality of first electrodes provided in the one surface side of the first substrate, a second electrode in which one surface side thereof faces each of the first electrodes and display functional layers which are provided between each of the first electrodes and the second electrode and the partition wall layer is disposed to define a forming region for each of the plurality of display pixels, wherein the second electrode is disposed so as to face the plurality of first electrodes including an upper surface of the partition wall layer, a resistive film which has a predetermined resistivity in which one surface side thereof is provided so as to face the other surface side of the second electrode via a predetermined space above the upper surface of the partition wall layer and which is disposed so as to be conductive to the other surface side of the second electrode by a pressure applied from outside, a voltage applying circuit to form a voltage gradient in a first direction of the resistive film and a voltage gradient in a second direction orthogonal to the first direction of the resistive film, a position detection circuit to detect a position where the resistive film is conductive to the second electrode based on a voltage value of a voltage detected from the second electrode when the resistive film is conductive to the second electrode, and a switching circuit to connect the second electrode to the position detection circuit when in an operation mode to detect the position where the pressure is applied, and to connect the second electrode to a voltage source for applying a voltage to drive the plurality of display pixels when in an operation mode to carry out an image display in the display panel.

To obtain the above advantage, a drive control method of a display apparatus according to the present invention includes writing display data in a plurality of display pixels of a display panel by connecting a second electrode to a voltage source for applying a voltage to drive the plurality of display pixels, in a writing operation period which is a part of a certain operation period, displaying an image according to the display data in the display panel by connecting the second electrode to the voltage source for applying the voltage to drive the plurality of display pixels, in a display operation period which is a part of the operation period, and detecting a position where a resistive film is conductive to the second electrode based on a voltage value of a voltage which is detected from the second electrode when the second electrode and the resistive film be conductive due to a pressure by shutting off the second electrode from the voltage source and by forming a voltage gradient in a predetermined direction in the resistive film, in a position detection operation period which is a part of the operation period, and the display apparatus comprises a display panel which comprises a plurality of display pixels and a partition wall layer (16), the plurality of display pixels are arranged in a two-dimensional array in one surface side of a first substrate which are formed of a plurality of first electrodes provided in the one surface side of the first substrate, a second electrode in which one surface side thereof faces each of the first electrodes and display functional layers which are provided between each of the first electrodes and the second electrode and the partition wall layer is disposed to define a forming region for each of the plurality of display pixels, wherein the second electrode is disposed so as to face the plurality of first electrodes including an upper surface of the partition wall layer, and a resistive film which has a predetermined resistivity in which one surface side thereof is provided so as to face the other surface side of the second electrode via a predetermined space above the upper surface of the partition wall layer and which is disposed so as to be conductive to the other surface side of the second electrode by a pressure applied from outside.

To obtain the above advantage, a manufacturing method of a display apparatus according to a second aspect of the present invention is a manufacturing method of a display apparatus having a plurality of display pixels comprising forming a plurality of first electrodes on one surface side of a substrate, forming a partition wall layer for defining a forming region of each of the plurality of display pixels on the ones surface side of the substrate, forming a display functional layer on an upper surface of the first electrodes, forming a second electrode so that one surface side of the second electrode face each of the first electrodes via the display functional layer including an upper surface of the partition wall layer, forming a display panel having a plurality of display pixels formed of the plurality of first electrodes, the display functional layer and the second electrode, and attaching a resistive film having a predetermined resistivity so that one surface side of the resistive film face the other surface side of the second electrode of the display panel and so as to be conductive to the other surface side of the second electrode due to a pressure being applied from outside by having a predetermined space above the upper surface of the partition wall layer.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 6 is a main structure diagram showing an example of a position detection module which is applied to the display apparatus according to the embodiment;

FIGS. 7A and 7B are schematic diagrams for explaining a position detection operation of the position detection module according to the embodiment;

FIG. 15 is a schematic diagram showing the second embodiment of the display apparatus according to the present invention.

DETAILED DESCRIPTION OF THE PREFERRED EMBODIMENTS

Hereinafter, the display apparatus according to the present invention and the manufacturing method thereof will be described in detail by presenting embodiments.

Here, in the embodiments presented hereinbelow, a case where the technical idea of the present invention is applied to an organic EL display panel which has a structure where a plurality of display pixels having organic EL elements (light emitting elements) are arranged in a two-dimensional array and which displays image information by each of the display pixels carrying out light emitting operation at a brightness gradation according to display data (video signal) as a display panel will be described. However, the technical idea of the present invention may be applied to display panels which display image information by other display methods.

First Embodiment (Display Apparatus)

First, the display apparatus according to the present invention will be described.

Figure 1:
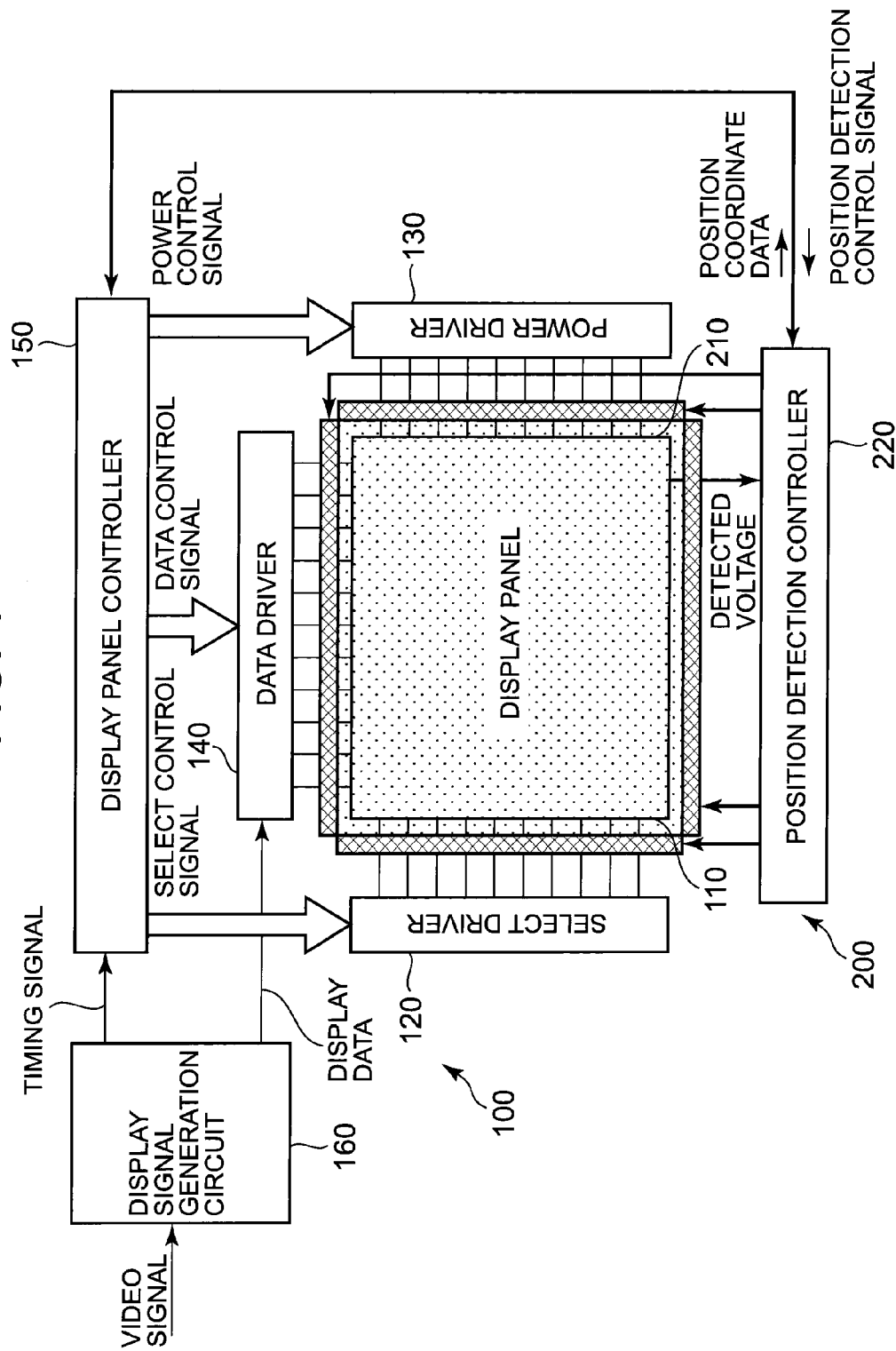
FIG. 1 is a schematic diagram showing the first embodiment of a display apparatus according to the present invention.

FIG. 1 is a schematic diagram showing the first embodiment of the display apparatus according to the present invention.

Figure 2:
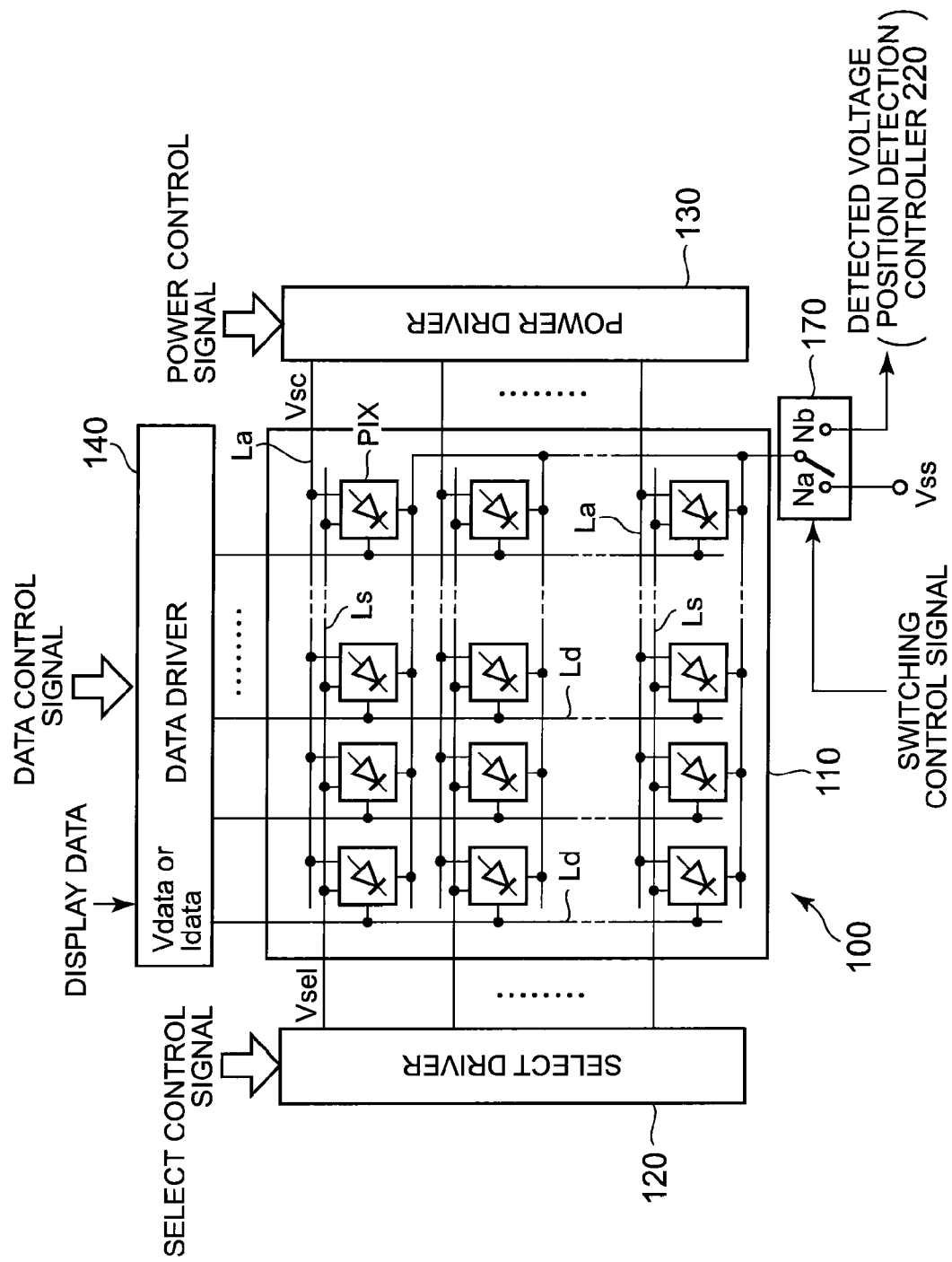
FIG. 2 is a main structure diagram showing an example of a display panel module which is applied to the display apparatus according to the embodiment.

FIG. 2 is a main structure diagram showing an example of a display panel module which is applied to the display apparatus according to the embodiment.

In FIG. 1, in order to clarify the arrangement between the display panel module and a position detection module (touch panel module), hatching is carried out for descriptive purposes.

As shown in FIG. 1, the display apparatus according to the embodiment comprises a display panel module 100 and a position detection module 200.

As shown in FIGS. 1 and 2, the display panel module 100 roughly comprises a display panel 110, a select driver 120, a power driver 130, a data driver 140, a display panel controller 150, a display signal generation circuit 160 and an electrode connection switching switch 170. The position detection module 200 roughly comprises a plane coordinate circuit 210 and a position detection controller 220.

The embodiment has a structure where the plane coordinate circuit 210 of the position detection module 200 is disposed in the visual field side (front side in the diagram) of the display panel 110 of the display panel module 100 so as to face the display panel 110 having a predetermined space therebetween. Further, although detail description will be given later, the embodiment has a structure where an opposite electrode which constructs the display panel 110 is double used as a voltage detection electrode of the position detection module 200.

(Display Panel Module)

As shown in FIG. 2, the display panel 110 has a pixel array formed of a plurality of select lines Ls which are disposed in the line direction, a plurality of data lines Ld which are disposed in the column direction and a plurality of display pixels PIX which are disposed near each of intersections of the plurality of select lines Ls and the plurality of data lines Ld, in a display region defined on an insulative substrate.

The select driver 120 is connected to each of the select lines Ls which are disposed in the line direction (right to left direction in FIG. 2) of the display panel 110. The select driver 120 sequentially applies a select signal Vsel at a select level (for example, high level) to each of the select lines Ls at a predetermined timing. By applying the select signal Vsel to each of the select lines Ls, the display pixels PIX of each line are sequentially set to be in a selection state.

The power driver 130 is connected to a plurality of power voltage lines La which are disposed so as to be parallel to the select line Ls of each line. The power driver 130 applies power voltage Vsc to each of the power voltage lines La at a predetermined timing. Here, the power driver 130 applies the power voltage Vsc of high level to the power voltage lines La at the time when a light emitting operation is carried out in the display pixels PIX of each line, and applies the power voltage Vsc of low level to the power voltage lines La at the time when a writing operation is carried out (at the time of non-light emitting operation).

The data driver 140 is connected to each of the data lines Ld which are disposed in the column direction (up-down direction in FIG. 2) in the display panel 110. The data driver 140 supplies a gradation signal (for example, a gradation voltage Vdata or a gradation current Idata) according to the display data to each of the data lines Ld. In such way, the gradation signal is written in the display pixels PIX which are set to be in the select state.

Here, in the embodiment, either one of a gradation control system of a voltage assigned type where the light emitting brightness of the organic EL elements OEL is controlled by adjusting the voltage value of the gradation voltage Vdata to be supplied and a gradation control system of a current assigned type where light emitting brightness of the organic EL elements OEL is controlled by adjusting the current value of the gradation current Idata to be supplied may be used.

The display panel controller 150 controls the operation state of at least the above mentioned select driver 120, power driver 130 and data driver 140 based on a timing signal which is supplied from the after mentioned display signal generation circuit 160. The display panel controller 150 generates and outputs a select control signal, a power control signal and a data control signal to execute a predetermined display drive operation in the display panel 110. Further, the display panel controller 150 transmits a position detection control signal to the after mentioned position detection controller 220 of the position detection module 200 at a predetermined timing, and also, carries out a control to execute a specific display operation in the display panel 110 based on a position coordinate data which is transmitted from the position detection controller 220.

For example, the display signal generation circuit 160 generates display data (brightness gradation data) based on a video signal which is supplied from outside of the display panel module 100 and supplies the generated display data to the data driver 140. The display signal generation circuit 160 extracts or generates a timing signal (system clock or the like) for displaying a predetermined image information in the display panel 110 based on the display data and supplies the timing signal to the display panel controller 150.

The switching operation of the electrode connection switching switch 170 is controlled based on a switching control signal from the display panel controller 150. The electrode connection switching switch 170 switches the opposite electrode (after mentioned cathode electrode of the organic EL element OEL) which is common to the light emitting element of each of the display pixels PIX so as to be selectively connected to either one of a predetermined reference voltage Vss (for example, ground voltage 0V) and the position detection controller 220.

The electrode connection switching switch 170 connects the above mentioned opposite electrode to a reference voltage source and sets the opposite electrode to the reference voltage Vss when an image display operation is carried out in the display panel module 100 based on the switching control signal. On the other hand, when a position detection operation is carried out in the position detection module 200, the electrode connection switching switch 170 connects the above mentioned opposite electrode to the position detection controller 220 and transmits the voltage of the opposite electrode as the detected voltages Vx1, Vy1.

(Display Pixel)

A specific example of a display pixel which can be applied to the display panel module according to the embodiment will be described.

Figure 3:
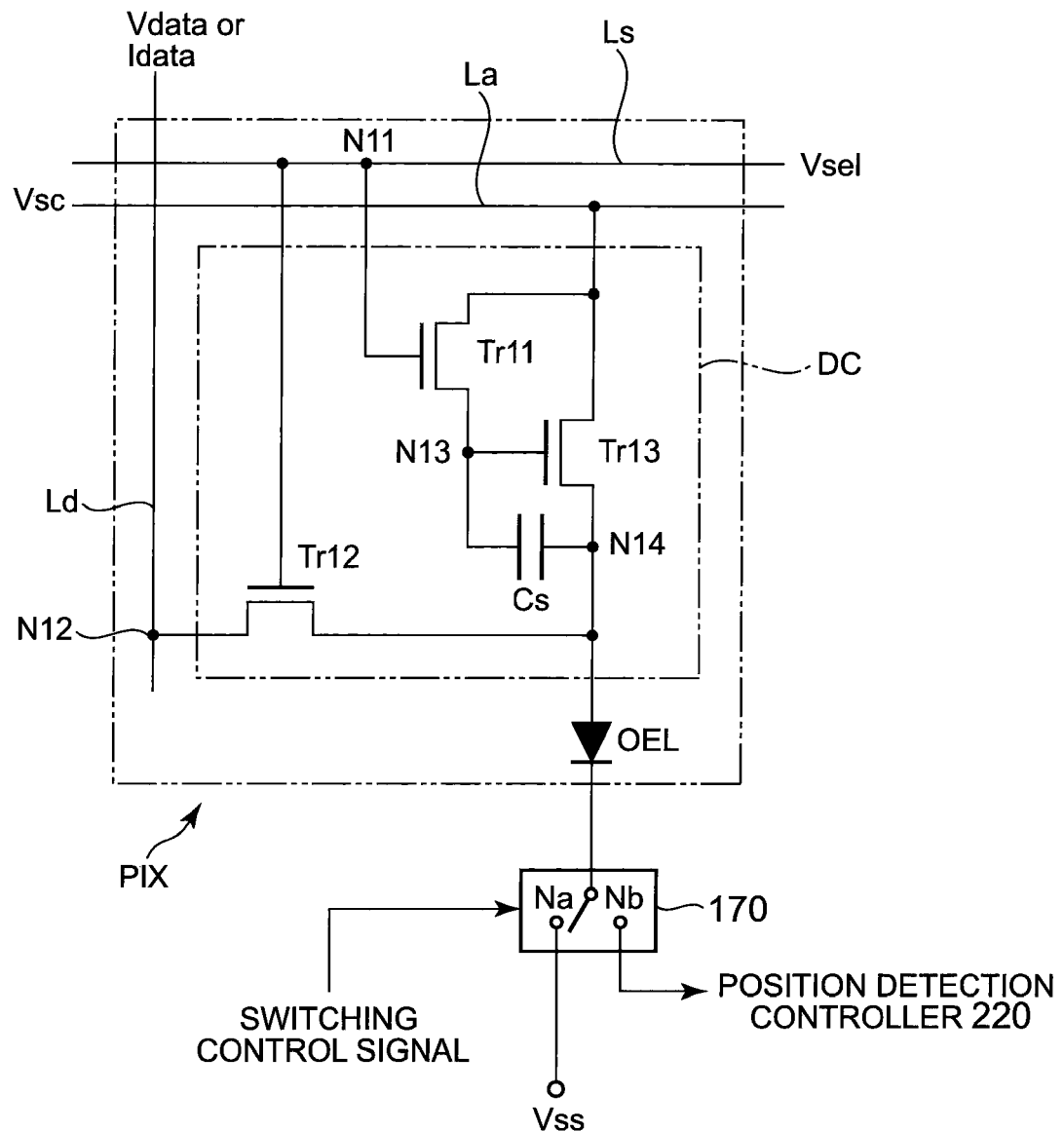
FIG. 3 is an equivalent circuit diagram showing a circuit structure example of a display pixel which is arranged in a two-dimensional array in a display panel according to the embodiment.

FIG. 3 is an equivalent circuit diagram showing a circuit structure example of a display pixel which is to be arranged in a two-dimensional array in the display panel according to the embodiment.

Here, a circuit structure example of a display pixel having a pixel drive circuit formed of three transistors (for example, formed of amorphous silicon film transistor or the like) and one capacitor.

As shown in FIG. 3, the display pixel PIX comprises a pixel drive circuit DC and an organic EL element OEL which is a light emitting element. In particular, the pixel drive circuit DC comprises transistors Tr11, Tr12, Tr13 and a capacitor Cs.

In the transistor Tr11, a gate terminal is connected to the select line Ls (contact point N11), further, a drain terminal is connected to the power voltage line La and a source terminal is connected to a contact point N13.

In the transistor Tr12, a gate terminal is connected to the select line Ls (contact point N11), a source terminal is connected to the data line Ld (contact point N12) and a drain terminal is connected to a contact point N14.

In the transistor Tr13, a gate terminal is connected to the contact point N13, a drain terminal is connected to the power voltage line La and a source terminal is connected to the contact point N14.

The capacitor Cs is connected between the gate terminal (contact point N13) of the transistor Tr13 and the source terminal (contact point N14).

In the organic EL element OEL, an anode terminal (anode electrode) is connected to the contact point N14 of the pixel drive circuit DC and a cathode terminal (cathode electrode) is connected to the electrode connection switching switch 170. The cathode terminal of the organic EL element OEL is selectively connected to either one of the reference voltage source (omitted in the diagram) which generates a reference voltage of low potential which is predetermined and the position detection controller 220 of the position detection module 200 via the electrode connection switching switch 170.

Here, potential of the reference voltage Vss is set based on the power voltage Vsc which is applied to the power voltage line La. That is, in the writing operation period where a gradation signal according to display data is supplied to the display pixel PIX, the reference voltage Vss has a same potential as the power voltage Vsc which is set to a low level or the reference voltage Vss has a potential higher than the power voltage Vsc. On the other hand, in the light emitting operation period where the display pixel PIX (organic EL element OEL) carries out the light emitting operation at a predetermined brightness gradation, potential of the reference voltage Vss is set to a potential lower than the power voltage Vsc which is set to high level, and the reference voltage Vss is set to the ground potential 0V, for example.

The cathode terminal (cathode electrode) of the organic EL element OEL is constructed of a single electrode layer (opposite electrode which is after mentioned) which is common to the plurality of display pixels PIX which are arranged in a two-dimensional array in the display panel 110. When the cathode terminal of the organic EL element OEL is connected to the reference voltage source via the electrode connection switching switch 170, the reference voltage Vss is commonly applied to the plurality of display pixels PIX.

(Drive Control of Display Pixel)

The drive control operation in the display pixel PIX having such circuit structure as described above is set to execute the writing operation (select period) to hold voltage component according to the display data and the light emitting operation (non-select period) to make the organic EL element OEL carry out the light emitting operation at a brightness gradation according to the display data during a predetermined processing cycle period.

In the writing operation (select period) to the display pixel PIX, a select voltage Vsel of a select level (on level; for example, high level) is applied to the select line Ls from the select driver 120. In this writing operation (select period), a low level power voltage Vsc is applied to the power voltage line La from the power driver 130. At this time, based on the switching control signal supplied from the display panel controller 150, the electrode connection switching switch 170 is set so as to be switched to the contact point Na in the reference voltage source side and the reference voltage Vss is applied to the cathode terminal (opposite electrode which is after mentioned) of the organic EL element OEL. Then, during this operation period, a gradation signal (a gradation voltage Vdata or a gradation current Idata) according to display data is supplied to the data line Ld from the data driver 140.

In such way, the display pixel PIX is set to a select state and the transistors Tr11 and Tr12 carries out an ON operation. The low level power voltage Vsc is applied to the gate terminal (contact point N13) of the transistor Tr13, and also, the source terminal (contact point N14) of the transistor Tr13 is electrically connected to the data line Ld.

Here, the gradation voltage Vdata or the gradation current Idata which is to be supplied to the data line Ld has a voltage value or a current value according to the brightness gradation value of the display data which is to be written in the display pixel PIX, and the gradation voltage Vdata or the gradation current Idata is set so as to have negative polarity, for example.

In this way, a potential different occurs between the contact point N13 and the contact point N14 (that is, between gate-source of the transistor Tr13). In such way, the transistor Tr13 carries out an ON action. Then, a writing current Ia which corresponds to the gradation voltage Vdata or the gradation current Idata flows to a direction of the data driver 140 via the transistor Tr13, the contact point N14, the transistor Tr12 and the data line Ld from the power voltage line La.

At this time, an electric charge corresponding to the potential difference occurred between the contact points N13 and N14 is accumulated and maintained as a voltage component in the capacitor Cs. Here, a power voltage Vsc which has a potential same as the reference voltage Vss or which has a potential lower than the reference voltage Vss is applied to the power voltage line La, and a potential of the anode terminal (contact point N14) of the organic EL element OEL becomes same as the potential (reference voltage Vss) of the cathode terminal or a potential lower than the potential of the cathode terminal. Therefore, electric current does not flow to the organic EL element OEL and the light emitting operation is not carried out (non-light emitting operation).

Next, in the light emitting operation (non-select period) after the writing operation is finished, a select voltage Vsel of not select level (low level) is applied to the select line Ls from the select driver 120. Then, in synchronization with the above timing or at a predetermined timing, a high level power voltage Vsc is applied to the power voltage line La from the power driver 130.

In this way, the transistors Tr11 and Tr12 carry out an OFF operation and the applying of the power voltage Vsc to the gate terminal (contact point N13) of the transistor Tr13 is shut off, and also, the supplying of the gradation signal to the data line Ld from the data driver 140 is shut off. At this time, the electric charge which is accumulated in the above described writing operation is held in the capacitor Cs. Therefore, the transistor Tr13 maintains to be in an ON state. Further, a power voltage Vsc having a potential higher than the reference voltage Vss is applied to the power voltage line La. Therefore, the potential which is applied to the anode terminal (contact point N14) of the organic EL element OEL becomes higher than a potential (reference voltage Vss) of the cathode terminal.

Therefore, a predetermined light emitting drive current Ib flows to the organic EL element OEL via the transistor Tr13 and the contact point N14 from the power voltage line La, and the organic EL element OEL carries out the light emitting operation. At this time, the voltage component which is held by the capacitor Cs corresponds to the potential difference of when the writing current Ia is flowing between the source-drain of the transistor Tr13. Therefore, the light emitting drive current Ib which flows to the organic EL element OEL has a current value which is approximately the same as the above mentioned writing current Ia (Ib≈Ia). In such way, the organic EL element OEL emits light at a brightness gradation according to the display data.

Here, in the above described structural example, the circuit structure where three transistors are provided is shown as the pixel drive circuit DC. However, the present invention is not limited to the embodiment. Other circuit structures comprising two or more transistors can be applied as the pixel drive circuit DC.

Moreover, a case where organic EL elements OEL are applied as light emitting elements to be driven so as to emit light by the pixel drive circuit DC is shown. However, the present invention is not limited to the above case, and other light emitting element such as a light emitting diode, for example, can be applied as long as it is a light emitting element of a current control type.

(Panel Structure of Display Apparatus)

Next, a specific panel structure (a plane layout and a cross-sectional structure) of the display apparatus having display pixels (pixel drive circuit and organic EL elements) having the above described circuit structure will be described. Here, a case where an organic EL display panel having a light emitting structure of a top emission type in which a light which is emitted in the organic EL elements OEL of the display panel module 100 is outputted to a visual field side (front side in FIG. 1) via a plane coordinate circuit 210 of the position detection module 200 is shown.

Figure 4:
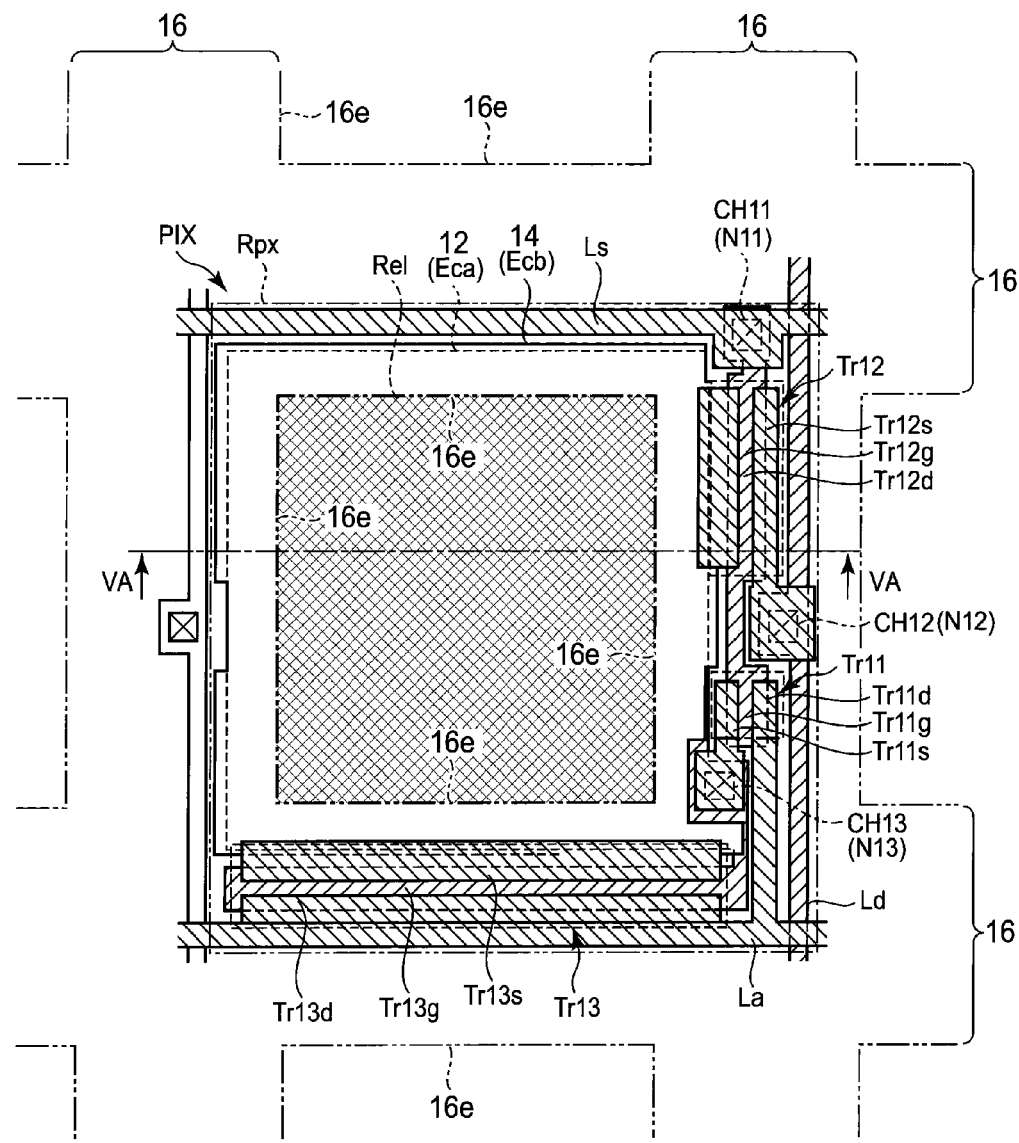
FIG. 4 is a plane layout diagram showing an example of a display pixel which can be applied to the embodiment.

FIG. 4 is a plane layout diagram showing an example of a display pixel which can be applied to the embodiment.

Here, in FIG. 4, the layout is depicted centering on the layer in which each of the transistors and the wiring (select line Ls, power voltage line La, data line Ld and the like) of the pixel drive circuit DC are formed shown in FIG. 3. Here, in order to make electrodes of each of the transistors, each of the wiring layers and the planar shape of the pixel electrode be clear, hatchings are carried out for descriptive purposes.

Figure 5:
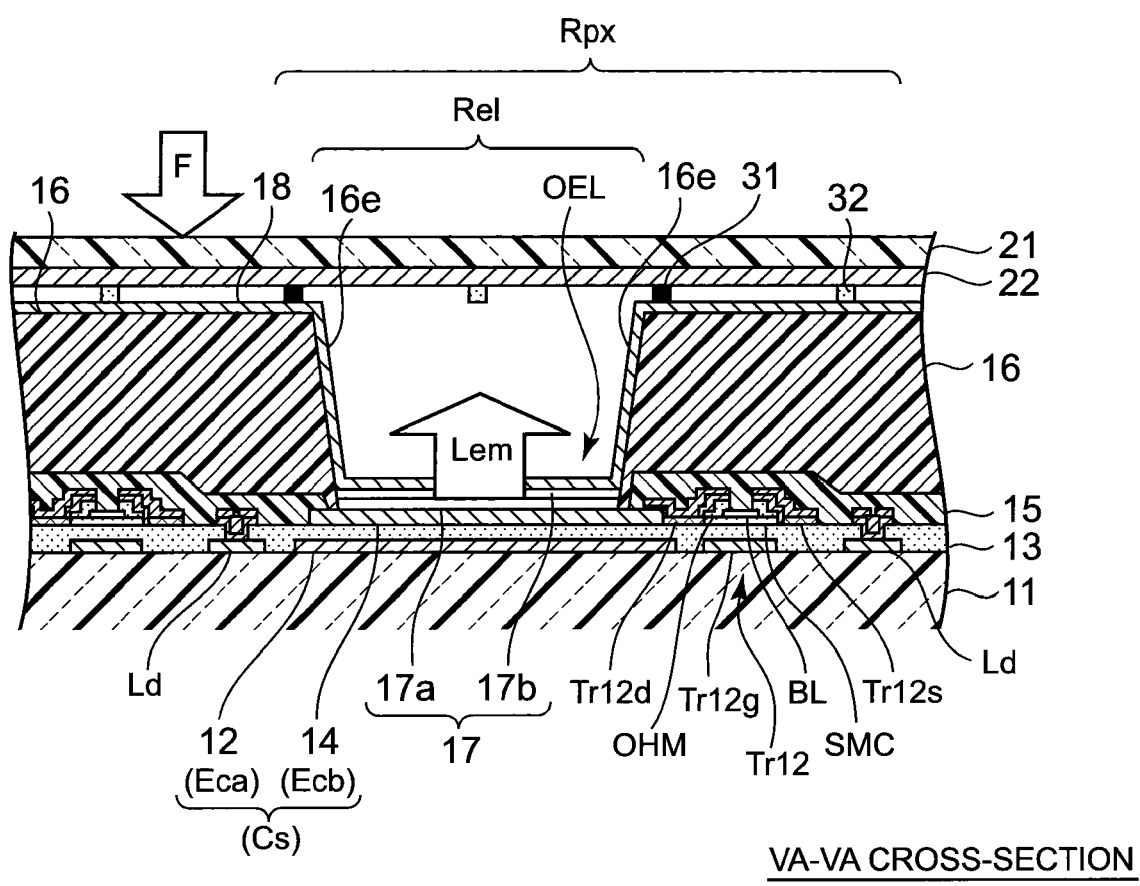
FIG. 5 is a main structure diagram of the display apparatus according to the embodiment.

FIG. 5 is a main structure diagram of the display apparatus according to the embodiment.

Here, FIG. 5 is a schematic cross-sectional diagram showing a cross-section along the line VA-VA (in the specification, "V" is conveniently used as a symbol corresponding to a roman numeral "5" shown in FIG. 4, and the same applies hereinafter) in the display pixel having a planar layout shown in FIG. 4.

In particular, as shown in FIGS. 4 and 5, the display pixel PIX having the circuit structures shown in FIG. 3 is provided to each pixel forming region Rpx defined in one surface side (visual field side) of the insulative substrate 11. In the pixel forming region Rpx, at least a forming region (EL element forming region) Rel of the organic EL element OEL and a borderline region between the adjacent display pixel PIX are defined.

As shown in FIG. 4, in the margin regions of upper side and lower side in the diagram of the pixel forming region Rpx, the select line Ls and the power voltage line La are disposed so as to extend in the line direction (right-left direction in the diagram), respectively. On the other hand, in the edge region of right side in the diagram of the pixel forming region Rpx, the data line Ld is disposed so as to bisect the above mentioned select line La and power voltage line La at right angles and so as to extend in the column direction (up-down direction in the diagram).

Moreover, in the borderline region which is defined in the margin regions of periphery of the pixel forming region Rpx, a partition wall layer 16 as shown in FIGS. 4 and 5, for example, is disposed so as to astride the display pixels PIX which are adjacently arranged in up-down direction and in right-left direction. The partition wall layer 16 has a shape protruding from the surface of the insulative substrate 11. The partition wall layer 16 is disposed so as to extend in the line directions and the column directions (that is, in a lattice), for example. Further, a region in which the pixel electrode 14 is exposed (shown by hatching in FIG. 4) is defined as the EL element forming region Rel by being surrounded with side walls 16e of the partition wall layer 16. Here, the partition wall layer 16 may be disposed so as to extend only in the column direction.

For example, as shown in FIGS. 4 and 5, the data line Ld is provided in a lower layer side (insulative substrate 11 side) than the select line Ls and the power voltage line La. By patterning a gate metal layer for forming the gate electrodes Tr11g to Tr13g of the transistors Tr11 to Tr13, the data line Ld is formed in a same process as the gate electrodes Tr11g to Tr13g. As shown in FIG. 5, the data line Ld is connected to the source electrode Tr12s of the transistor Tr12 via a contact hole CH12 (corresponding to the contact point N12 shown in FIG. 3) which is provided at the gate insulating film 13 which is formed on the data line Ld by a coating deposition. In such way, by disposing the data line Ld on the insulative substrate 11, the gate insulating film 13, the insulating film 15 and the partition wall layer 16 are to stand between the data line Ld and the after mentioned opposite electrode 18. Therefore, parasitic capacitance between the opposite electrode 18 and the data line Ld can be reduced and delay of signal to be supplied to the data line Ld can be inhibited.

By patterning a source-drain metal layer for forming the source electrodes Tr11s to Tr13s and the drain electrodes Tr11d to Tr13d of the transistors Tr11 to Tr13, the select line Ls and the power voltage line La are formed in a same process as forming the source electrodes Tr11s to Tr13s and the drain electrodes Tr11d to Tr13d. As shown in FIG. 4, the select line Ls is connected to the gate electrodes Tr11g and Tr12g of the transistors Tr11 and Tr12 via the contact hole CH11 (corresponding to the contact point N11 shown in FIG. 3) provided at the gate insulating film 13 of the lower layer. The power voltage line La is integrally formed with the drain electrodes Tr11d and Tr13d of the transistors Tr11 and Tr13.

Here, the data line Ld, the select line Ls and the power voltage Line La may have a laminate structure formed of a lower layer wiring and an upper layer wiring, for example. As shown in FIG. 5, the lower layer wiring of the data line Ld is formed by patterning the gate metal layer as described above. For the lower layer wiring, a low resistive metal layer formed of a metal material to reduce wiring resistance, such as simple aluminum and aluminum allow, for example, can be applied. As shown in FIG. 5, the upper layer wiring of the data line Ld is formed by patterning the source-drain metal layer, for example. For the upper layer wiring, a single layer of a low resistive metal to reduce wiring resistance such as simple aluminum, aluminum alloy and the like or a laminate structure in which the above mentioned low resistive metal layer is provided above a transitional metal layer to reduce migration such as chromium (Cr), titanium (Ti) and the like, for example, can be applied.

Here, as for the select line Ls and the power voltage line La, similarly to the data line Ld, a lower layer wiring having a laminate structure in which a low resistive metal layer for reducing wiring resistance such as simple aluminum, aluminum alloy and the like is provided on a transition metal layer for reducing migration formed of chromium (Cr), titanium (Ti) and the like and an upper layer wiring of a single layer of a low resistive metal for reducing wiring resistance formed of simple aluminum, aluminum alloy and the like or an upper having a laminate structure in which the above mentioned low resistive metal layer is provided on a transition metal layer for reducing migration such as chromium (Cr), titanium (Ti) and the like can be applied.

Moreover, in particular, the transistors Tr11 and Tr12 of the pixel drive circuit DC shown in FIG. 3 are disposed so as to extend in the column direction along the data line Ld as shown in FIG. 4, for example. In such case, the transistors Tr11 and Tr12 are disposed so that the width directions of channels thereof are parallel to the data line Ld. Further, as shown in FIG. 4, the transistor Tr13 of the pixel drive circuit DC is disposed so as to extend in the line direction along the power voltage line La, for example. In such case, the transistor Tr13 is disposed so that the width direction of a channel thereof is parallel to the power voltage line La.

Here, for example, each of the transistors Tr11 to Tr13 has a well known thin-film transistor structure of electric field effect type. In such case, as shown in FIGS. 4 and 5, the transistors Tr11 to Tr13 comprise the gate electrodes Tr11g to Tr13g, semiconductor layers SMC formed in regions corresponding to each of the gate electrodes Tr11g to Tr13g via the gate insulating film 13, and the source electrodes Tr11s to Tr13s and the drain electrode Tr11d to Tr13d which are formed so as to extend in both edge portions of the semiconductor layers SMC, respectively.

Here, in FIG. 5, a channel protective layer BL is formed of oxide silicon, silicon nitride or the like, and has a function to prevent etching damage to the semiconductor layer SMC. Further, an impurity layer OHM is formed of a n$^+$ silicon layer formed of amorphous silicon including impurity of n-type, and has a function to realize an ohmic connection between the semiconductor layer SMC and the source electrodes Tr11s to Tr13s and between the semiconductor layer SMC and the drain electrodes Tr11d to Tr13d.

Moreover, as shown in FIG. 4, in the transistors Tr11 and Tr12, the gate electrodes Tr11g and Tr12g are connected to the select line Ls via the contact hole CH11 which is provided at the gate insulating film 13 so as to correspond to the circuit structure of the pixel drive circuit DC shown in FIG. 3. The drain electrode Tr11d of the transistor Tr11 is formed integrally with the power voltage line La. The source electrode Tr11s of the transistor Tr11 is connected to the gate electrode Tr13g and the metal layer 12 which becomes the lower electrode Eca of the capacitor Cs via the contact hole CH13 provided at the gate insulating film 13.

As shown in FIGS. 4 and 5, the drain electrode Tr12d of the transistor Tr12 is connected to the pixel electrode 14 of the organic EL element OEL. The pixel electrode 14 is double used as the upper electrode Ecb of the capacitor Cs. The pixel electrode 14 is formed of a reflective metal layer such as Al. The source electrode Tr12s of the transistor Tr12 is connected to the data line Ld via the contact hole CH12 provided at the gate insulating film 13.

Moreover, as shown in FIG. 4, in the transistor Tr13, the gate electrode Tr13g is connected to the source electrode Tr11s of the transistor Tr11 and also to the metal layer 12 via the contact hole CH13 provided at the gate insulating film 13. Further, the drain electrode Tr13d of the transistor Tr13 is formed integrally with the power voltage line La. The source electrode Tr13s of the transistor Tr13 is connected to the above mentioned pixel electrode 14.

As shown in FIGS. 4 and 5, the capacitor Cs comprises the lower electrode Eca, the upper electrode Ecb which faces the lower electrode Eca and the gate insulating film 13 which stands between the lower electrode Eca and the upper electrode Ecb. Here, the gate insulating film 13 is double used as a dielectric layer of the capacitor Cs. Further, the upper electrode Ecb is double used as the pixel electrode 14 of the after mentioned organic EL element OEL. That is, the capacitor Cs is provided in a lower layer side (insulative substrate 11 side) of the organic EL element OEL. Here, similarly to the above described data line Ld, the metal layer 12 which becomes the lower electrode Eca may be formed in a same process as the gate electrodes Tr11g to Tr13g of the transistors Tr11 to Tr13 by patterning the gate metal layer.

As shown in FIG. 5, the organic EL element OEL has an element structure in which the pixel electrode (for example, anode electrode) 14, the organic EL layer (light emitting function layer) 17 and the opposite electrode (for example, cathode electrode) 18 are orderly laminated. The pixel electrode 14 is provided on the gate insulating film 13 of the transistors Tr11 to Tr13 and is double used as the upper electrode Ecb of the capacitor Cs, as described above. Further, the pixel electrode 14 is directly connected to the drain electrode Tr12d of the transistor Tr12 and the source electrode Tr13s of the transistor Tr13 and a predetermined light emitting drive current is supplied from the pixel drive circuit DC.

The organic EL layer 17 is formed on the pixel electrode 14 which is exposed in the EL element forming region Rel which is defined by the side walls 16e of the partition wall layer 16 formed on the insulative substrate 11. The organic EL layer 15 is formed of a hole injection layer (or a hole transport layer including a hole injection layer; carrier transport layer) 17a and an electron transport light emitting layer 17b (carrier transport layer), and among these carrier transport layers, the layer which functions as a light emitting layer is formed of an organic material.

The opposite electrode 18 is formed of an electrode layer (solid electrode) which commonly faces each pixel electrode 14 of the plurality of display pixels PIX which are arranged in a two-dimensional array on the insulative substrate 11. The opposite electrode 18 is provided so as to extend not only over the EL element forming region Rel of each display pixel PIX but also over the partition wall layer 16 which defines the EL element forming region Rel. In such way, at the time of image display operation in the display panel module 100, a predetermined reference voltage Vss (cathode voltage; for example, ground potential 0V) is applied to the opposite electrode 18 via the electrode connection switching switch 170 shown in FIGS. 2 and 3. Further, at the time of position detection operation in the position detection module 200, potential of the opposite electrode 18 is transmitted to the position detection controller 220 as a detected voltage via the electrode connection switching switch 170.

Here, the display panel 110 according to the embodiment has a light emitting structure of a top emission type. Therefore, the opposite electrode 18 is formed of an (transparent) electrode material having a light transmittance characteristic, such as indium tin oxide (ITO), indium zinc oxide or the like. On the other hand, the pixel electrode 14 is formed by including a metallic material having a light reflective characteristic, such as simple aluminum (Al), aluminum alloy or the like.

As shown in FIG. 5, the insulating film 15 is provided at the borderline region (periphery region of each EL element forming regions Rel) of the display pixels PIX on the insulative substrate 11 so as to cover the transistors Tr11 to Tr13 and the wiring layer. As shown in FIGS. 4 and 5, the partition wall layer 16 is formed on the insulating film 15 which is provided at the borderline regions of the display pixels PIX so as to have a predetermined thickness (height). Here, the partition wall layer 16 is formed of a photosensitive resin material, for example. In such way, a region in which the pixel electrode 14 is exposed by being surrounded by the side walls 16e of the partition wall layer 16 provided at the borderline region of the display pixels PIX is defined as the EL element forming region Rel of each display pixel PIX.

In this way, in the display apparatus (display panel 110) according to the embodiment, the opposite electrode 18 has a light transmittance characteristic and the pixel electrode 14 has a light reflective characteristic. In such way, a light emitted in the organic EL layer 17 of the organic EL element OEL based on the drive control operation of the display pixel PIX is outputted (arrow Lem) to the visual field side (upper side in the drawing) via the opposite electrode 18 directly or by being reflected by the pixel electrode 14 as shown in FIG. 5. That is, the display apparatus according to the embodiment has a light emitting structure of a top emission type.

Here, in the panel structure of the display panel 110 shown in FIG. 5, a structure where the pixel electrode 14 of the organic EL element OEL reflects the light emitted in the organic EL layer 17 and the light is outputted to the visual field side which is the upper side in the diagram is shown. However, the present invention is not limited to this structure. For example, the pixel electrode 14 of the organic EL element OEL may have a light transmittance characteristic and the metal layer 12 of the lower layer of the pixel electrode 14 may be formed with a metal material having a light reflective characteristic to reflect the light emitted in the organic EL layer 17.

(Position Detection Module)

FIG. 6 is a main structure diagram showing an example of a position detection module (touch panel module) which is applied to the display apparatus according to the embodiment.

Here, a description will be given by arbitrarily referring to the structure (FIGS. 1, 4 and 5) of the above described display panel 110.

As shown in FIG. 6, the position detection module 200 comprises a plane coordinate circuit (first circuit, second circuit) 210, a position detection controller 220 and a voltage detection electrode where the opposite electrode 18 of the display panel 110 (organic EL element OEL) is double used as the voltage detection electrode. In the embodiment, a touch panel of a resistive film system is structured with the plane coordinate circuit 210 and the opposite electrode 18 which is a voltage detection electrode. That is, the embodiment has a structure in which a part of the display panel module 100 and a part of the position detection module 200 are combined and are formed integrally.

As shown in FIGS. 5 and 6, the plane coordinate circuit 210 includes a transparent dielectric film (hereinafter, called "transparent resistive film") 22 which functions as a resistive film having a predetermined resistivity, a pair of X coordinate electrodes 23a and 23b and a pair of Y coordinate electrodes 24a and 24b in one surface side (non-visual field side) of the transparent insulative substrate 21 such as a film or glass having flexibility. Here, the plane coordinate circuit 210 has flexibility with respect to a pressure from outside.

The transparent resistive film 22 has a spreading of at least same as the display region (pixel array) of the above described display panel 110 or greater, and also has a planar shape of rectangle so as to correspond to the display region. Further, as shown in FIG. 5, the transparent resistive film 22 is disposed so as to face the opposite electrode 18 which is the voltage detection electrode having a minute space therebetween. Here, for the transparent resistive film 22, a thin film made of a transparent electrode material such as ITO or the like is applied, for example.

Moreover, the X coordinate electrodes 23a and 23b are electrically connected to the transparent resistive film 22 along each of the pair of sides of the transparent resistive film 22 in the X direction (right-left direction in FIGS. 1 and 6; line direction) which are facing each other. The Y coordinate electrodes 24a and 24b are electrically connected to the transparent resistive film 22 along each of the pair of sides of the transparent resistive film 22 in the Y direction (up-down direction in FIGS. 1 and 6; column direction) which are facing each other. Here, for the X coordinate electrodes 23a and 23b and the Y coordinate electrodes 24a and 24b, an electrode material of low resistance such as aluminum, titanium or the like is applied, for example.

Further, in the pair of X coordinate electrodes 23a and 23b, a predetermined high voltage is applied to one of the electrodes at a predetermined timing from the position detection controller 220 and a predetermined low voltage is applied to the other electrode to form a voltage gradient in the X direction of the transparent resistive film 22. Furthermore, in the pair of Y coordinate electrodes 24a and 24b, a predetermined high voltage is applied to one of the electrodes and a predetermined low voltage is applied to the other electrode at a timing different from the timing of applying voltage to the X coordinate electrodes 23a and 23b to form a voltage gradient in the Y direction of the transparent resistive film 22.

As described above, the opposite electrode 18 which is double used as the voltage detection electrode is structured with an electrode layer which is common to a plurality of display pixels PIX (organic EL elements OEL) arranged in the display panel 110. Further, when the position detection operation is to be carried out, the voltage detection electrode (opposite electrode 18) is connected to the after mentioned position detection controller 220 via the electrode connection switching switch 170. Further, the opposite electrode 18 transmits a voltage which is generated by the transparent resistive film 22 of the plane coordinate circuit 210 contacting the voltage detection electrode (opposite electrode 18) as a detected voltage.

Moreover, as shown in FIG. 5, in the plane coordinate circuit 210 having a structure as described above, the transparent resistive film 22 on the insulative substrate 21 is disposed so as to face the opposite electrode 18 which is provided in the display region of the display panel 110 via an insulative spacer 32 having a predetermined thickness (height), for example. The plane coordinate circuit 210 (transparent resistive film 22) and the display panel 110 (opposite electrode 18) are adhesively secured by an insulative adhesive agent 31, for example. In such way, a user of the display apparatus can visually recognize the image information displayed in the above described display panel 110 via the plane coordinate circuit 210 (insulative substrate 21 and transparent resistive film 22) from the visual field side.

Here, as described above, the display panel 110 has a panel structure where the partition wall layer 16 is continuously projected in a lattice form from the surface of the insulative substrate 11. Therefore, as shown in FIG. 5, the plane coordinate circuit 210 (transparent resistance film 22) only faces the opposite electrode 18 which is formed on the upper surface of the partition wall layer 16 by having a minute space which is the thickness of the spacer 32 therebetween, and also, the plane coordinate circuit 210 is adhesively secured by the adhesive agent 31.

Here, in FIG. 5, a structure where the adhesive agent 31 and the spacer 32 are uniformly provided on the transparent resistive film 22 of the plane coordinate circuit 210 despite the concavo-convex shape in the display panel 110 side is shown. However, the area of the transparent resistive film 22 where a space is maintained between the display panel 110 (opposite electrode 18) and where adhesively secured is limited to the upper surface portion (that is, a lattice portion shown in FIG. 4) of the partition wall layer 16 of the display panel 110. Therefore, the structure may be that the adhesive agent 31 and the spacer 32 are not provided on the transparent resistive film 22 in the area corresponding to the EL element forming region Rel, for example.

Moreover, the above described adhesive agent 31 is not limited to a member or a liquid formulation having the adhesive function, and the adhesive agent 31 may also have a function as a drying agent and a spacer, for example.

Similarly, the spacer 32 is not limited to a member having a function as a spacer, and the spacer 32 may also have a function as a drying agent and an adhesive agent, for example.

In such way, by making either one of the adhesive agent 31 and the spacer 32 have a function of a drying agent, moisture in the sealed space which is formed by attaching the display panel 110 and the plane coordinate circuit 210 together can be removed or reduced, and further, deterioration of characteristics of the organic EL element OEL due to the moisture can be inhibited. Furthermore, the adhesive agent 31 and the spacer 32 may be structured with a member having high flexibility as long as the space between the transparent resistive film 22 of the plane coordinate circuit 210 and the opposite electrode 18 of the display panel 110 can be maintained in a good condition.

At the time of position detection operation, the position detection controller 220 forms a voltage gradient in a predetermined direction of the transparent resistive film 22 by applying voltage to the X coordinate electrodes 23a and 23b and the Y coordinate electrodes 24a and 24b of the plane coordinate circuit 210. Then, the position detection controller 220 calculates the contact point Pf of the transparent resistive film 22 and the voltage detection electrode (opposite electrode 18), that is, a pushed position which is pushed by a user based on the detected voltage from the voltage detection electrode (opposite electrode 18) which is read via the electrode connection switching switch 170.

Moreover, the position detection controller 220 transmits coordinate data (position coordinates data) regarding the pushed position (contact point Pf) which is calculated by the above position detection operation to the display panel controller 150. In such way, for example, a specific display operation is executed to the display panel 110 based on the position coordinate data.

Here, the position detection controller 220 executes the above described series of position detection operation based on the position detection control signal which is transmitted from the display panel controller 150 of the display panel module 100, for example.

Here, it is preferable that the position detection controller 220 shuts off the applying of voltage to the X coordinate electrodes 23a and 23b and the Y coordinate electrodes 24a and 24b of the plane coordinate circuit 210 except during the position detection operation to make the transparent resistive film 22 of the plane coordinate circuit 210 be in a floating state.

(Position Detection Control of Position Detection Module)

Next, the position detection operation in the position detection module which is applied in the embodiment will be described.

FIG. 7 is a schematic diagram for explaining the position detection operation of the position detection module according to the embodiment.

Here, a description will be given by arbitrarily referring to the structure of the position detection module 200 shown in FIG. 6.

In the position detection operation in the position detection module according to the embodiment, first, a voltage gradient is formed in the X direction of the transparent resistive film 220. In order to form the above voltage gradient, a voltage Vcc (for example, −5 V) is applied to one of the pair of the X coordinate electrodes 23a and 23b of the plane coordinate circuit 210 from the position detection controller 220 and a reference voltage (for example, ground voltage 0V) is applied to the other of the pair of the X coordinate electrodes 23a and 23b of the plane coordinate circuit 210 from the position detection controller 220 based on the position detection control signal from the display panel controller 150 of the display panel module 100. In such way, the voltage gradient is formed in the X direction of the transparent resistive film 22.

When a user pushes an arbitrary position as shown by an arrow F in the diagram from the other side (upper side in the diagram) of the insulative substrate 21 of the position detection module 200 as shown in FIG. 5 in a above described state, at this time, the contact point Pf corresponding to the pushed position in the transparent resistive film 22 of the plane coordinate circuit 210 contacts the opposite electrode 18 which is the voltage detection electrode. In such way, as shown in FIG. 7A, a voltage which is the divided voltage of the voltage Vcc divided at the coordinate X1 in the X direction corresponding to the contact point Pf of the transparent resistive film 22 is detected as the detected voltage Vx1 by the position detection controller 220 via the electrode connection switching switch 170 from the opposite electrode 18 which is the voltage detection electrode. Here, the detected voltage Vx1 in the X direction is expressed by the following formula (1) based on the equivalent circuit shown in FIG. 7B.

$$Vx1 = Vcc \times Rb/(Ra+Rb) \quad (1)$$

Here, Ra and Rb are resistance values of voltage-division resistance which divides the voltage Vcc at the contact point Pf of the transparent resistance film 22. Ra is a voltage-division resistance between the contact point Pf and an electrode (for example, X coordinate electrode 23b) to which the voltage Vcc (for example, −5V) is applied, and Rb is a voltage-division resistance between the contact point Pf and an electrode (for example, X coordinate electrode 23a) to which the reference voltage (0V) is applied. Therefore, as for the detected voltage Vx1 which is to be detected from the opposite electrode 18, a voltage close to the voltage Vcc is detected as the contact point Pf is closer to the direction of the X coordinate electrode 23b to which the voltage Vcc is applied. On the other hand, a voltage close to 0V is detected as the contact point Pf is closer to the direction of the X coordinate electrode 23a to which the reference voltage (0V) is applied.

Then, as shown in FIG. 7B, for example, an analog/digital conversion (A/D conversion) is carried out to the detected voltage Vx1 in the position detection controller 220, and the position coordinate data X1 in the X direction of the contact point Pf is calculated by carrying out the coordinate conversion process based on a predetermined calculation formula (X1=f(Vx1)).

Next, in a similar way as described above, a voltage gradient in the Y direction of the transparent resistive film 22 is formed. In order to form the voltage gradient in the Y direction of the transparent resistive film 22, a voltage Vcc (for example, −5V) is applied to one of the pair of Y coordinate electrode 24a and 24b of the plane coordinate circuit 210 from the position detection controller 220, and a reference voltage (for example, ground voltage 0V) is applied to the other of the pair of Y coordinate electrode 24a and 24b of the plane coordinate circuit 210 from the position detection controller 220. In such way, when a user pushes an arbitrary position of the position detection module 200, the contact point Pf corresponding to the pushed position of the transparent resistive film 22 of the plane coordinate circuit 210 contacts the opposite electrode 18 as shown in FIG. 7A. In this way, a voltage which is the divided voltage of the voltage Vcc divided at the coordinate Y1 in Y direction corresponding to the contact point Pf of the transparent resistive film 22 is detected as the detected voltage Vy1 from the opposite electrode 18 which is the voltage detection electrode. The detected voltage Vy1 in Y direction is expressed by the following formula (2) based on FIG. 7B.

$$Vy1 = Vcc \times Rb/(Ra+Rb) \qquad (2)$$

Then, the position coordinate data Y1 in Y direction of the contact point Pf is calculated by carrying out the A/D conversion to the detected voltage Vy1 and by carrying out the coordinate conversion process based on a predetermined calculation formula (Y1=f(Vy1)), for example. By alternatively repeating the position detection operation in X direction and in Y direction of the contact point Pf (pushes position) in the above described position detection module 200, X and Y coordinate values (position coordinate data) of the contact point Pf (pushed position) are determined.

Here, in the display apparatus according to the embodiment, the contact point Pf where the transparent resistive film 22 and the opposite electrode 18 of the display panel contact each other by a user pushing the insulative substrate 21 in the plane coordinate circuit 210 side of the position detection module 200 is limited to be in the upper surface region of the partition wall layer 16 for defining the EL element forming region Rel of each display pixel PIX. Therefore, in a structure where the display panel module 100 and the position detection module 200 are integrally formed, the pressure will not be directly applied to the organic EL element OEL and the pixel drive circuit DC even when a user pushes an arbitrary position on the insulative substrate 21 of the plane coordinate circuit 210, and an impact to the quality of the display apparatus can be inhibited.

(Drive Control Method of Display Apparatus)

Next, a drive control method (display drive operation and position detection operation) in the display apparatus according to the embodiment will be described with reference to the diagrams.

Figure 8:
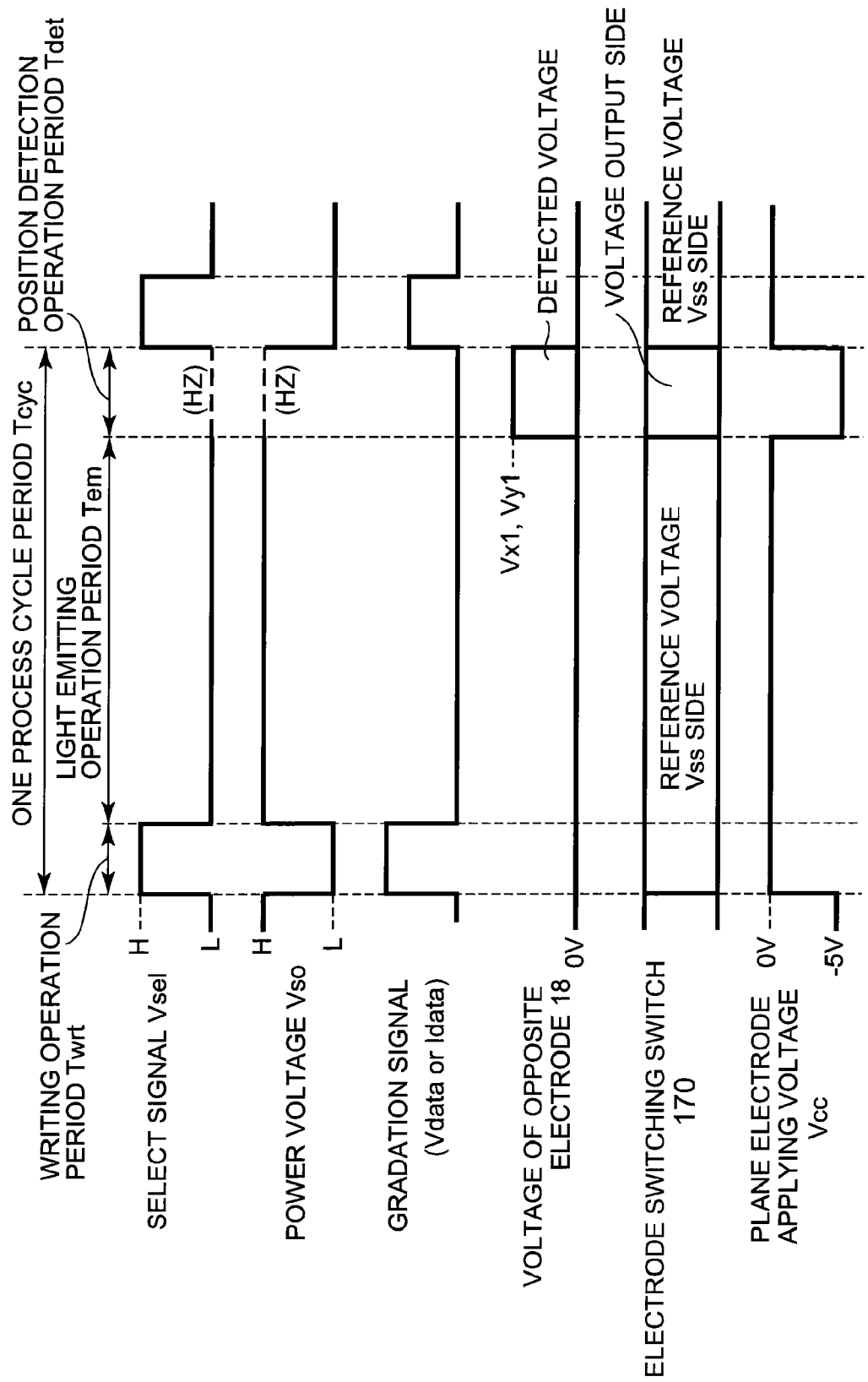
FIG. 8 is a timing chart showing a drive control method of the display apparatus according to the embodiment.

FIG. 8 is a timing chart showing a drive control method of the display apparatus according to the embodiment.

As shown in FIG. 8, the drive control method of the display apparatus according to the embodiment is set so as to include at least a writing operation period Twr, a light emitting operation period Tem and a position detection operation period Tdet in a predetermined one process cycle period Tcyc. Here, a drive control in the writing operation period Twrt and the light emitting operation period Tem is same as the drive control method in the above described display pixel. Therefore, description will be given centering on an operation specific to the drive control method of the display apparatus according to the embodiment.

In the writing operation period Twrt, a writing operation to write a gradation signal according to display data in each of the display pixels PIX which are arranged in a two-dimensional array is executed. In particular, as shown in FIG. 8, first, by the electrode connection switching switch 170 being set in the contact point Na side based on a switching control signal which is transmitted from the display panel controller 150 of the display panel module 100, the reference voltage Vss (ground potential 0V) is applied to the opposite electrode 18. Further, the reference voltage (ground voltage 0V) is applied to the X coordinate electrodes 23a and 23b and the Y coordinate electrodes 24a and 24b of the plane coordinate circuit 210 from the position detection controller 220 of the position detection module 200. In such way, function of the position detection module 200 (plane coordinate circuit 210) stops.

Next, based on a select control signal which is transmitted from the display panel controller 150, a select signal Vsel of a select level (high level) is sequentially applied to the display pixels PIX of each line from the select driver 120 so as to make the display pixels PIX be in a select state. Further, in synchronization with the above timing, a low level power voltage Vsc is sequentially applied to the display pixels PIX in a line, which are set to be in the select state, from the power driver 130 based on a power control signal which is transmitted from the display panel controller 150.

Then, writing of display data is carried out by the display data which is to be transmitted from the display signal generation circuit 160 being converted to a gradation signal (gradation voltage Vdata or gradation current Idata) in the data driver 140 based on a data control signal which is transmitted from the display panel controller 150 and by the gradation signal being supplied to the display pixels PIX which are set to be in the select state. As described above, in the writing operation, by the power voltage Vsc being set to a low level, current does not flow to the organic EL elements OEL, therefore, the organic EL elements OEL are set so as to be in a non-light emitting state. Here, as described above, the gradation signal (gradation voltage Vdata or gradation current Idata) in the embodiment has a negative polarity. However, the gradation signal in FIG. 8 shows an absolute value.

In the light emitting operation period Tem, an operation to display image information in the display panel 110 is executed by each of the display pixels PIX (organic EL elements OEL) emitting light based on the written display data.

In particular, similarly to the above described writing operation period Twrt, the electrode connection switching switch 170 is set in the contact point Na side and the reference voltage (ground voltage 0V) is applied to the plane coordinate circuit 210, as shown in FIG. 8. In the above described state, based on the select control signal which is transmitted from the display panel controller 150, a select signal Vsel of a non-select level (low level) is applied to the display pixels PIX in the line in which the above described writing operation is finished and the display pixels PIX are set to be in a non-select state.

In synchronization with the above timing, a high level power voltage Vsc is applied to the display pixels PIX in the line which is set to be in the non-select state from the power driver 130 based on the power control signal which is transmitted from the display panel controller 150. In such way, a light emitting drive current according to the display data written in each display pixel PIX flows to the organic EL element OEL, and the organic EL element OEL emits light at a brightness gradation according to the display data. By sequentially executing the above described light emitting operation for the display pixels PIX in each line which are arranged in the display panel 110, image information based on a video signal is to be displayed.

Next, in the position detection operation period Tdet, an operation to detect a position in which the position detection module 200 (plane coordinate circuit 210) disposed in front (in visual field side) of the display panel 110 is pushed is carried out. In such way, for example, a user visually recognizes the image information to carry out a desired input operation. In particular, first, the select driver 120, the power driver 130 and the data driver 140 are separated electrically from the display panel 110 based on the select control signal, the power control signal and the data control signal which are transmitted from the display panel controller 150, and the select line Ls and the power voltage line La are set to be in a high-impedance state (shown by "HZ" in the drawing) as shown in FIG. 8. In such way, the opposite electrode 18 of the display panel 110 functions as the voltage detection electrode which is electrically independent from the display pixels PIX (organic EL elements OEL and pixel drive circuit DC). Further, the electrode connection switching switch 170 is set in the contact point Nb side based on the switching control signal which is transmitted from the display panel controller 150. In such way, the opposite electrode 18 which is double used as a voltage detection electrode is connected to the position detection controller 220 of the position detection module 200 to be set in a voltage output state.

Next, as described above, a predetermined voltage Vcc (−5V) and the reference voltage (ground potential 0V) are respectively applied to each of the pair of the X coordinate electrodes 23a and 23b of the plane coordinate circuit 210 from the position detection controller 220 to for a voltage gradient in the transparent resistive film 22. Then, a user visually recognizes the image information which is displayed in the display panel 110 with the above described light emitting operation and pushes a desired position in the insulative substrate 21 of the plane coordinate circuit 210 in order to select a desired function and to input information. In such way, a voltage (detected voltage Vx1) of the opposite electrode 18 corresponding to the contact point Pf (pushed position) of the transparent resistive film 22 of the plane coordinate circuit 210 and the opposite electrode 18 which functions as the voltage detection electrode is detected by the position detection controller 220 to calculate the position coordinate data X1 in X direction. Next, a voltage gradient is formed in Y direction orthogonal to the above mentioned X direction in the plane coordinate circuit 210, and the voltage (detected voltage Vy1) of the opposite electrode 18 corresponding to the above contact point Pf (pushed position) is detected by the position detection controller 220 to calculate the position coordinate data Y1 in Y direction. The pushed position (X and Y coordinate) is determined by such voltage detection in X and Y directions in the opposite electrode 18.

Here, the position coordinate data (X1, Y1) of the pushed position which is inputted by a user and calculated and determined by the position detection module 200 is transmitted to the display panel controller 150 of the display panel module 100 from the position detection controller 220. Then, in the image display operation (writing operation and light emitting operation) in the next process cycle period Tcyc, a user can be made to recognize the pushed position (input position) by highlighting the image corresponding to the pushed position, for example.

(Manufacturing Method of Display Apparatus)

Next, a manufacturing method of the above described display apparatus will be described.

FIGS. 9A, 9B and 9C and FIGS. 10A and 10B are process cross-sectional diagrams showing a manufacturing method of the display apparatus according to the embodiment.

Here, description will be given by arbitrarily referring to the structure of the display panel module 100 and the position detection module 200 shown in FIGS. 1 to 7.

In the manufacturing method of the display apparatus, first, semi-finished products of the display panel module 100 and the position detection module 200 are manufactured individually.

Figure 9A:
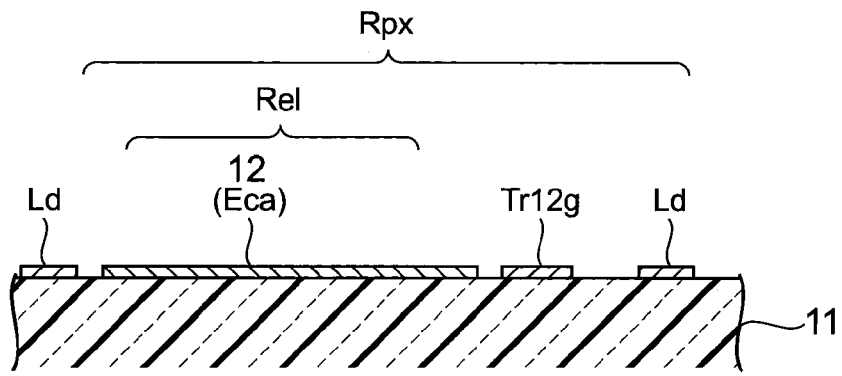
FIGS. 9A, 9B and 9C are process cross-sectional diagrams (No. 1) showing a manufacturing method of the display apparatus according to the embodiment.
Figure 9B:
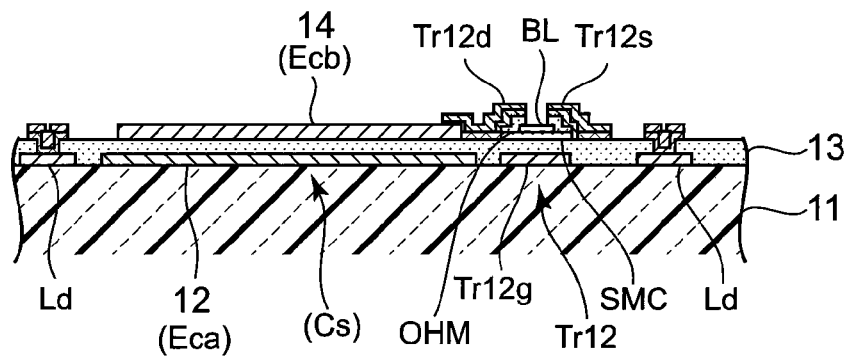

In the manufacturing method of the display panel module 100, first, a pixel array is formed by arranging functional elements such as the transistors Tr11 to Tr13, the capacitor Cs and the like which construct the above described pixel drive circuit DC (see FIGS. 3 and 4), various types of wiring layers such as the select line Ls, the power voltage line La, the data line Ld and the like, the insulating film 15, the partition wall layer 16 and a plurality of display pixels PIX comprising the organic EL elements OEL in the display region in one surface side (upper surface side in the diagram) of the insulative substrate 11 which is formed of glass, quartz, transparent resin or the like, for example, in a two-dimensional array as shown in FIGS. 9A and 9B.

In particular, first, a gate metal layer is formed on one surface side of the transparent insulative substrate 11 as shown in FIG. 9A, and the gate metal layer is patterned by using a photolithography method. In such way, the gate electrodes Tr11g to Tr13g of the transistors Tr11 to Tr13, the data line Ld and the metal layer 12 which becomes the lower electrode Eca of the capacitor Cs are formed at once in the pixel forming region Rpx (see FIGS. 4 and 5) of each display pixel PIX. Here, the gate electrodes Tr11g to Tr13g and the data line Ld are formed in a region (that is, borderline region) other than the EL element forming region Rel. Further, the metal layer 12 is formed so as to extend to the EL element forming region Rel, for example. Furthermore, the gate electrode Tr11g and Tr12g of the transistors Tr11 and Tr12 are integrally formed, and the gate electrode Tr13g and the metal layer 12 are integrally formed. Here, the game metal layer includes a metal material for reducing wiring resistance such as simple aluminum, aluminum alloy and the like, for example.

Next, as shown in FIG. 9B, the gate insulating film 13 is formed in the entire region of the insulative substrate 11. Thereafter, the semiconductor layer SMC formed of intrinsic amorphous silicon or the like, the channel protective layer BL formed of silicon nitride or the like and the impurity layer OHM for an ohmic connection are formed on the gate insulating film 13 corresponding to the gate electrodes Tr11g to Tr13g of each of the transistors Tr11 to Tr13, respectively.

Next, the pixel electrode 14 formed of a transparent (having light transmittance characteristic) electrode material such as ITO, indium zinc oxide or the like and which has a rectangular planar patter, for example, is formed on the gate insulating film 13 in the EL element forming region Rel of each display pixel PIX (pixel electrode forming step). In this way, the pixel electrode 14 faces the metal layer 12 which is the lower electrode Eca via the gate insulating film 13 which is double used as a dielectric layer as shown in FIGS. 4 and 5, and the pixel electrode 14 is double used as the upper electrode Ecb of the capacitor Cs (capacitor forming step).

Next, the source-drain metal layer is formed on one surface side of the insulative substrate 11 as shown in FIG. 9B, and the source-drain metal layer is patterned by using the photolithography method. In such way, the source electrodes Tr11s to Tr13s and the drain electrodes Tr11d to Tr13d are formed so as to extend to both edge portion of the semiconductor layer SMC of the transistors Tr11 to Tr13 via the impurity layer OHM. At the same time, the select line Ls and the power voltage line La are formed.

At this time, the drain electrode Tr11d of the transistor Tr11 is integrally formed with the power voltage line La as shown in FIG. 4. Further, the source electrode Tr11s of the transistor Tr11 is electrically connected to the gate electrode Tr13g of the transistor Tr13 of lower layer and the metal layer 12 which is the lower electrode Eca via the contact hole CH13 which is formed at the gate insulating film 13.

As shown in FIG. 4, the source electrode Tr12s of the transistor Tr12 is electrically connected to the data line Ld of lower layer via the contact hole CH12 which is formed at the gate insulating film 13. The drain electrode Tr12d of the transistor Tr12 is formed so as to extent onto the pixel electrode 14 in which one end thereof is formed on the gate insulating film 13 as shown in FIGS. 4 and 9B, and the drain electrode Tr12s and the pixel electrode 14 is electrically connected.

As shown in FIG. 4, the drain electrode Tr13d of the transistor Tr13 is integrally formed with the power voltage line La. The source electrode Tr13s of the transistor Tr13 is formed so that one end thereof extend onto the pixel electrode 14, and the source electrode Tr13s and the pixel electrode 14 are electrically connected.

As shown in FIG. 4, the select line Ls is electrically connected to the gate electrodes Tr11g and Tr12g of lower layer via the contact hole CH11 which is formed at the gate insulating film 13.

Here, as shown in FIG. 9B, the data line Ld may have a laminate structure where the upper layer wiring which is formed by patterning the source-drain metal layer is connected to the data line Ld via an opening formed at the gate insulating film 13.

Moreover, as shown in FIG. 9B, a laminate structure where a low resistive metal for reducing wiring resistance such as simple aluminum, aluminum alloy or the like, for example, is provided on the transition metal layer for reducing migration such as chromium (Cr), titanium (Ti) or the like, for example, may be applied to the source-drain metal layer for forming the source electrodes Tr11s to Tr13s and the drain electrodes Tr11d to Tr13d of the transistors Tr11 to Tr13.

Figure 9C:
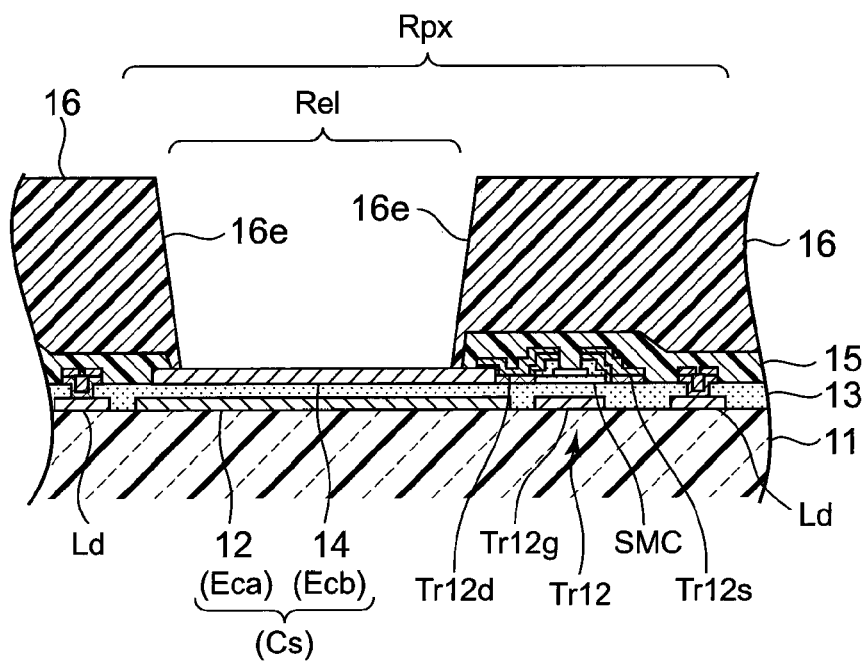

Next, as shown in FIG. 9C, the insulating film 15 is formed so as to cover the transistors Tr11 to Tr13, the select line Ls and the power voltage line La which are formed in the borderline region of each display pixel PIX. The insulating film 15 is formed of an inorganic insulative material such as silicon nitride, silicon oxide or the like and functions as an interlayer insulating film or a protective insulating film.

Next, as shown in FIGS. 4 and 9C, the partition wall layer 16 which has a planar shape of lattice form which is also continuously projected in the borderline region of the insulative substrate 11 is formed (partition wall layer forming step).

Here, the partition wall layer 16 is formed of a photosensitive resin material, for example, and has an opening from which at least the pixel electrode 14 of the EL element forming region Rel of each display pixel PIX is exposed. That is, in each pixel forming region Rpx, a region where the pixel electrode 14 is exposed by being surrounded by the side walls 16e of the partition wall layer 16 is defined as the EL element forming region Rel.

Figure 10A:
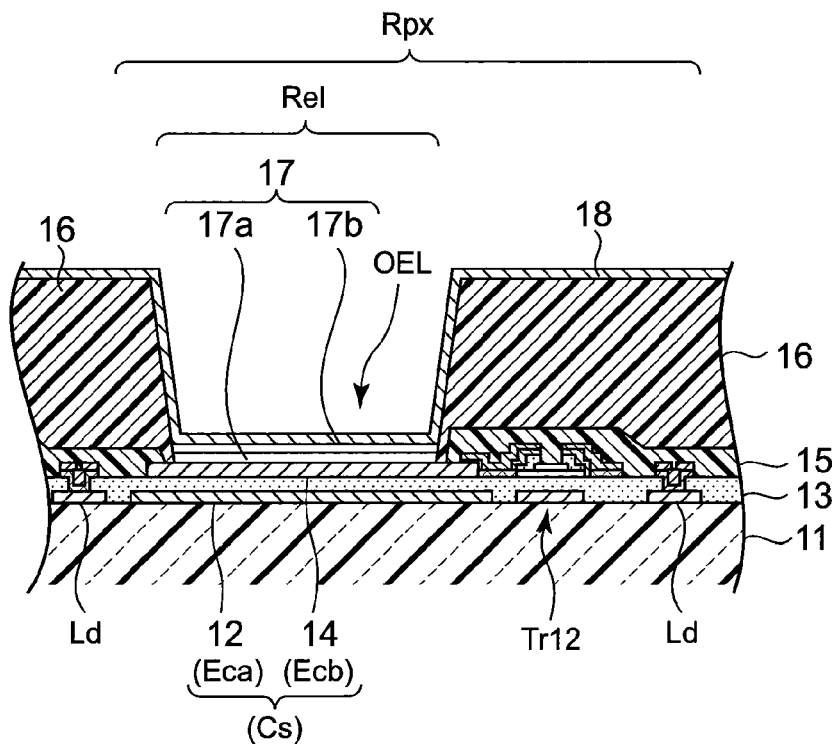
FIGS. 10A and 10B are process cross-sectional diagrams (No. 2) showing a manufacturing method of the display apparatus according to the embodiment.

Next, as shown in FIG. 10A, the hole transport layer 17a and the electron transport light emitting layer 17b are orderly formed on the pixel electrode 14 exposed in the EL element forming region Rel of each display pixel PIX by using a nozzle printing (or a nozzle coat) method, an inkjet method or the like, for example, to form the organic EL layer 17 (carrier transport layer forming step).

Thereafter, the opposite electrode (for example, cathode electrode) 18 which has a light transmittance characteristic and which commonly faces the pixel electrode 14 of each display pixel PIX via the organic EL layer 17 (hole transport layer 17a and electron transport light emitting layer) is formed in the display region in which the display pixels PIX are arranged on the insulative substrate 11.

Here, the opposite electrode 18 is formed as a common electrode layer (solid electrode) which not only extends to a region (EL element forming region Rel) which faces the pixel electrode 14 but also extends onto the partition wall layer 16 which is formed in the borderline region of the display pixel PIX. Here, for the opposite electrode 18, a film structure which is transparent in thickness direction where a thin film formed of a metal material such as barium, magnesium, lithium or the like which becomes an electron injection layer is formed by carrying out an evaporation method or the like, for example, and thereafter, a transparent electrode layer such as ITO is laminated on the thin film by a sputtering method or the like can be applied.

Figure 10B:
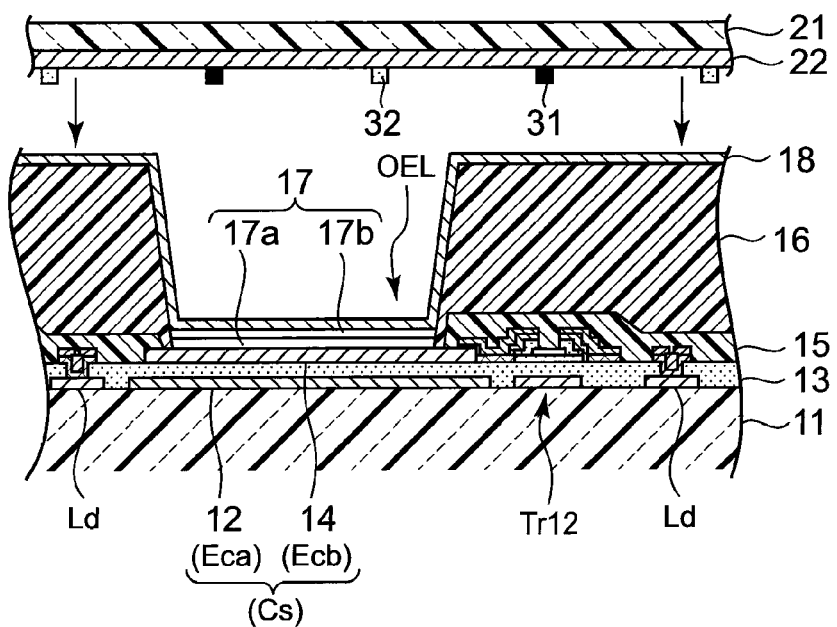

On the other hand, in a manufacturing method of the plane coordinate circuit 210 of the position detection module 200, the transparent resistive film 22 is formed on one surface side (on lower surface side in the diagram) of the insulative substrate 21 having a flexibility and which is formed of glass, quartz, transparent resin or the like, for example, as shown in FIG. 10B. Here, for example, a thin film formed of a transparent electrode material such as ITO or the like is applied as the transparent resistive film 22, and the transparent resistive film 22 is formed so as to at least have a spreading corresponding to the display region of the display panel 110.

Next, as shown in FIG. 6, the X coordinate electrodes 23a and 23b are formed along each of the part of sides in X direction of the transparent resistive film 22 which are facing each other in one surface side of the insulative substrate 21, and also, the Y coordinate electrodes 24a and 24b are formed along each of the pair of sides in Y direction of the transparent resistive film 22 which are facing each other in the one surface side of the insulative substrate 21. Here, a low resistive electrode material such as aluminum, titanium or the like, for example, is applied for the X coordinate electrodes 23a and 23b and the Y coordinate electrodes 24a and 24b.

Next, the adhesive agent 31 and the spacer 32 which are insulative are print-formed on the transparent resistive film 22. Here, as shown in FIG. 5, in the adhesive agent 31 and the spacer 32, placement spacing, planar shape, hardness of material and the like are set so that the transparent resistive film 22 in a region where the adhesive agent 31 and the spacer 32 are not formed and the opposite electrode 18 in the display panel 110 side electrically contact each other when a user pushes the other side (upper surface side in the diagram) of the insulative substrate 21 to select a desired operation and to input information.

Then, as shown in FIG. 10B, the display panel 110 and the plane coordinate circuit 210 are attached and sealed so as to face each other in an inert gas atmosphere such as nitrogen, argon or the like which is set at a pressure of about atmospheric pressure. In such way, the opposite electrode 18 which is formed on the upper surface of the partition wall layer 16 and the transparent resistive film 22 of the plane coordinate circuit 210 are adhesively secured via the adhesive agent 31 in a state where a space is maintained between the opposite electrode 18 and the transparent resistive film 22 by a spacer of a predetermined height standing therebetween.
(Verification of Effect)

Next, effects specific to the display apparatus and the manufacturing method thereof according to the embodiment will be described in detail.

Figure 11:
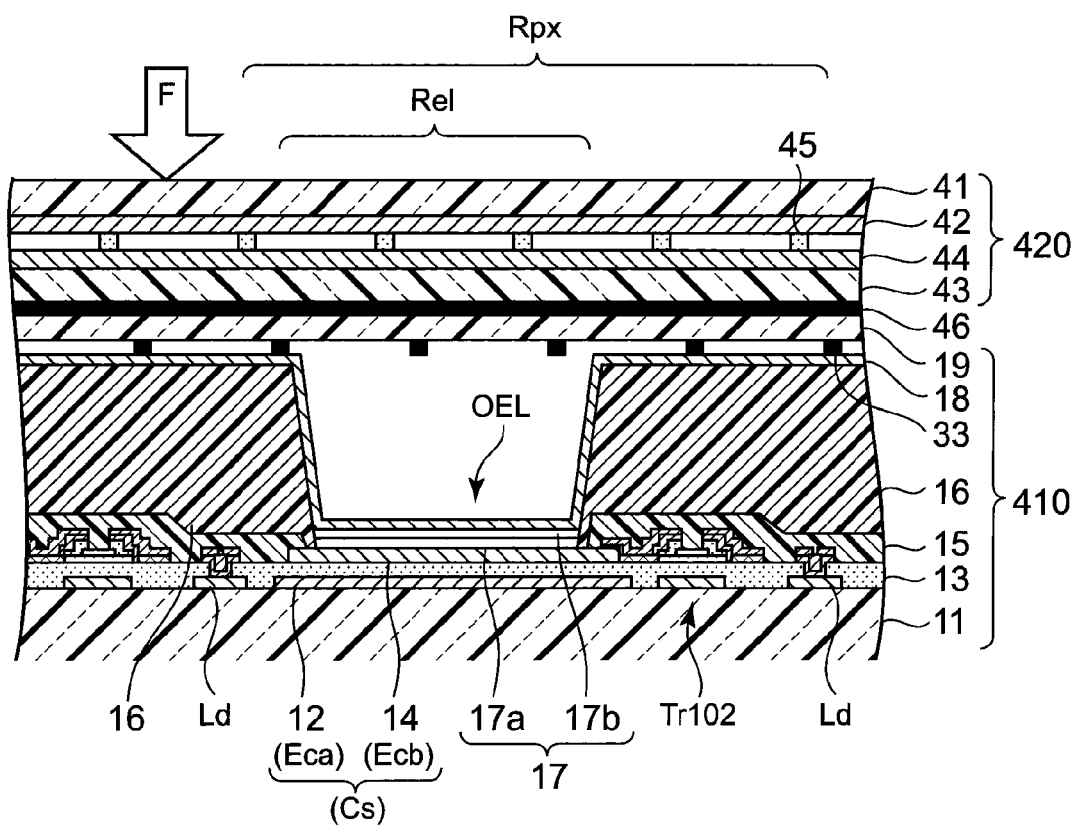
FIG. 11 is a schematic diagram schematically showing a display apparatus according to a comparison subject.

FIG. 11 is a schematic diagram schematically showing a display apparatus according a prior art to verify the effects of the display apparatus according to the embodiment (hereinafter, the display apparatus shown in FIG. 11 is called "comparison subject").

Here, in FIG. 11, a main structure cross-section of the display apparatus according to the comparison subject is shown to compare to the display apparatus according to the embodiment shown in FIG. 5.

Figure 12A:
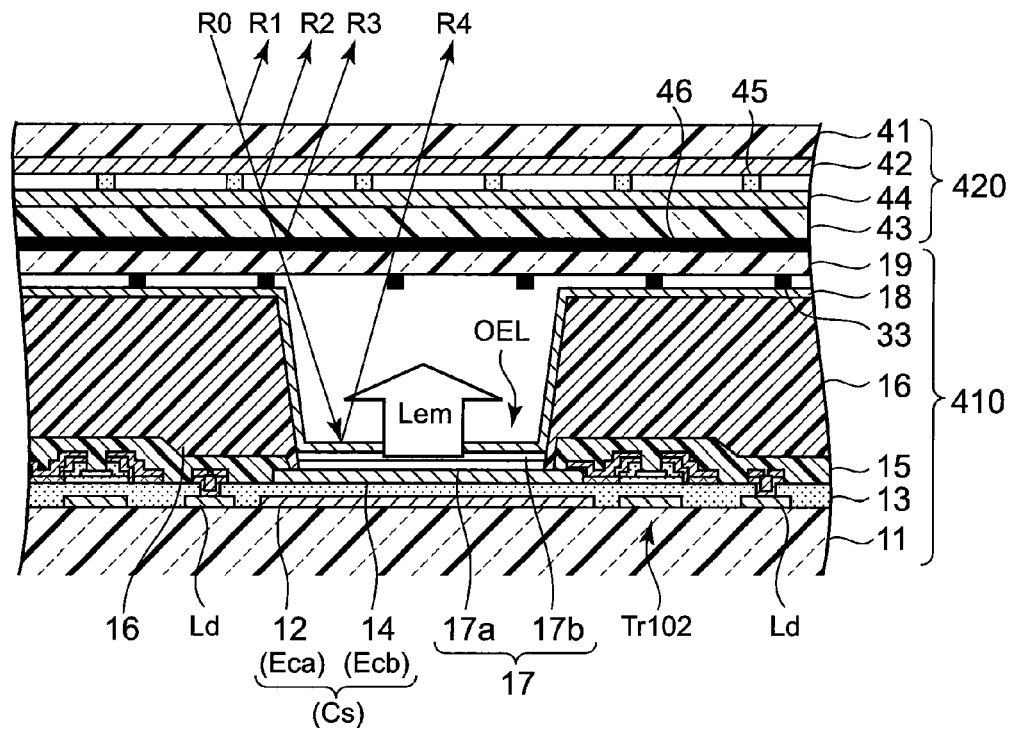
FIGS. 12A and 12B are schematic diagrams for explaining an effect of the display apparatus according to the embodiment.
Figure 12B:
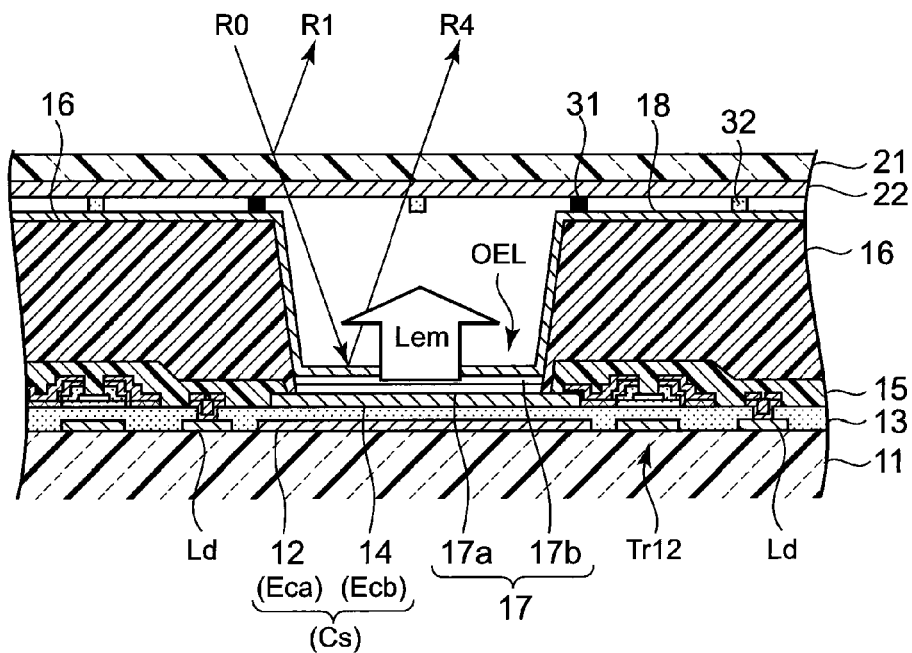

FIGS. 12A and 12B are schematic diagrams for explaining the effects of the display apparatus according to the embodiment.

Here, same symbols are used for structures which are similar to the structures of the embodiment and the descriptions are simplified or omitted.

As shown in FIG. 11, the display apparatus according to the comparison subject has a structure where a display panel 410 in the display panel module side and a touch panel 420 in the touch panel module side which are individually manufactured are attached together via an adhesive agent 46.

As shown in FIG. 11, similarly to the display panel 110 of the embodiment shown in FIG. 5, the display panel module according to the comparison subject has the display panel 410 in which a plurality of display pixels are arranged in a two-dimensional array in one surface side (upper surface side in the drawing) of the insulative substrate 11, each of the plurality of display pixels comprising an organic EL element OEL, a transistor Tr102 which constructs the pixel drive circuit DC, a wiring layer including a select line, a data line Ld and the like and a partition wall layer 16 for defining an EL element forming region Rel. Further, in the one surface side of the insulative substrate 11, a transparent sealing substrate 19 for sealing the display pixel is attached so as to seal via an adhesive agent 33.

As shown in FIG. 11, the touch panel module according to the comparison subject has a touch panel 420 in which a plane coordinate circuit constructed of a transparent resistive film 42, a coordinate electrode and the like provided in one surface side (lower surface side in the diagram) of a transparent insulative substrate 41 and a voltage detection electrode 44 constructed of a transparent electrode material provided in one surface side (upper surface side in the diagram) of the other transparent insulative substrate 43 are disposed so as to face each other via an insulative spacer 45 by having a predetermined space therebetween.

Further, the display apparatus according to the comparison subject has a panel structure where the sealing substrate 19 of the above described display panel 410 and the insulative substrate 43 of the touch panel 420 are attached to each other via the transparent adhesive agent 46. That is, the display apparatus according to the comparison subject is structured so that the transparent touch panel 420 is disposed in a visual field side of the display panel 410 which has a light emitting structure of a top emission type and so that the image information displayed in the display panel 410 is visually recognized via the touch panel 420.

Therefore, in the display apparatus according to the comparison subject (in a prior art), a large number of interfaces having different refraction factors exist. In such way, as shown in FIG. 12A, refraction factors vary greatly in a surface of the insulative substrate 41 and in a surface of the voltage detection electrode 44 of the touch panel 420, in an interface of the adhesive agent 46 and the sealing substrate 19 of the display panel 410, in a surface of the opposite electrode 18 (interface of the sealed space sealed by the sealing substrate 19 and the opposite electrode 18) and the like. Therefore, the light R0 which enters from outside of the display apparatus reflects in a visual field direction. In particular, for example, a reflection light R1 occurs at the surface of the insulative substrate 41 which is the interface of outside air and the insulated substrate 41, a reflection light R2 occurs at the surface of the voltage detection electrode 44 which is the interface of the space formed by the spacer 45 and the voltage detection electrode 44, a reflection light R3 occurs at the interface of the adhesive agent 46 and the insulating substrate 19 of the display panel 410 and a reflective light R4 occurs at the surface of the opposite electrode 18 which is the interface of the sealed space formed by the sealing substrate 19 and the opposite electrode 18. These reflective lights R1 to R4 are visually recognized by a user along with the light Lem which emitted in the organic EL elements OEL of the display panel 410.

In addition, in the display apparatus according to the comparison subject, a number of layers in which the light passes through exist until the light Lem which is emitted in the organic EL element OEL is visually recognized by a user. In such way, as shown in FIG. 12A, light intensity of the light Lem which is emitted from the organic EL element OEL is attenuated by passing through the opposite electrode 18 and the sealing substrate 19 of the display panel 410, the adhesive agent 46, the insulative substrates 43 and 41, the voltage detection electrode 44 and the transparent resistive film 42 of the touch panel 420 and the like.

Therefore, in the display apparatus according to the comparison subject, there was a problem that the contrast of the image information which is displayed in the display panel 410 is reduced and the display quality is degraded. Further, in the display apparatus according to the comparison subject, there was a problem that components cost increases and number of manufacturing process increases because the display apparatus has a structure where the display panel 410 and the touch panel 420 which are individual finished products are attached to each other. Furthermore, in order to connect the display panel module and the touch panel module to each other, a pull-out wiring such as a flexible print substrate (FPC) or the like needs to be provided. Therefore, there was a problem that mounting footprints and thickness of the display apparatus increase.

In contrast, the display apparatus according to the embodiment has a structure where the opposite electrode 18 which constructs the organic EL element OEL of the display panel module 100 is double used as a voltage detection electrode of the position detection module 200 as described above. In addition, the display apparatus according to the embodiment has a structure where a voltage of the opposite electrode 18 which is the voltage detection electrode is detected by the position detection controller 220 when the position detection operation by the position detection module 200 is carried out and a structure where the electrode connection switching switch 170 for selectively carrying out a control to supply a predetermined reference voltage (for example, ground potential) when displaying (carrying out light emitting operation of organic EL element OEL) of the image information by the display panel 110 is provided.

In such way, in the embodiment, the number of interfaces and light transmissive layers when the image information displayed in the display panel 110 is seen from a visual field side can be reduced greatly. That is, as shown in FIG. 12B, the interfaces in which reflection of light which is entered from outside is significant are only the surface of the insulative substrate 21 of the plane coordinate circuit 210 which is the interface between outside air and the insulative substrate 21 and the surface of the opposite electrode 18 which is the interface between the sealed space formed by the insulative substrate 21 and the opposite electrode 18, practically. Therefore, light reflection to a visual field side can be greatly inhibited. Further, as shown in FIG. 12B, the layers in which the light Lem which is emitted from the organic EL element OEL passes through are only the opposite electrode 18, the transparent resistive film 22 and the insulative substrate 21, practically. Therefore, attenuation of intensity of the light Lem can be greatly inhibited.

Thus, according to the display apparatus of the embodiment, a good contrast of the image information which is displayed in the display panel 110 can be maintained, and a display apparatus having a good display quality can be realized. Further, according to the display apparatus of the embodiment, the opposite electrode 18 and the voltage detection electrode of the display panel 110 are structured by the same electrode layer, and the display panel and the touch panel are integrally structured. Therefore, manufacturing cost can be reduced. Further, there is no need to connect each of the modules by FPC or the like as shown in the above described comparison subject. Therefore, mounting footprints and thickness of the display apparatus can be reduced.

Here, in the embodiment, a structure where the adhesive agent 31 and the spacer 32 which are insulative are formed in a predetermined pattern throughout approximately the entire surface area of the transparent resistive film 22 of the plane coordinate circuit 210 is shown. However, the present invention is not limited to this structure. That is, in the embodiment, the opposite electrode 18 of the display panel 110 and the transparent resistive film 22 of the plane coordinate circuit 210 are attached to each other by having a predetermined space therebetween only at the upper surface portion of the partition wall layer 16 which is a part of the display panel 110 where projects the most. Therefore, the adhesive agent 31 and the spacer 32 may be formed at least only at the region corresponding to the region (that is, borderline region of each display pixel PIX) of the display panel 110 where the partition wall layer 16 extends. Further, as for the structure to adhesively secure the display panel 110 and the plan coordinate circuit 210, various types of structural examples shown hereinbelow can be applied.

Other Structural Examples

FIGS. 13A, 13B, 13C and 13D and FIGS. 14A, 14B, 14C and 14D are main structure cross-sectional diagrams showing other structural examples of the display apparatus according to the first embodiment.

Here, structural examples for adhesively securing the opposite electrode 18 of the display panel 110 and the transparent resistive film 22 of the plane coordinate circuit 210 are shown. Here, same symbols are used for structures which are similar to the structures in the above described first embodiment and descriptions are simplified or omitted.

Figure 13A:
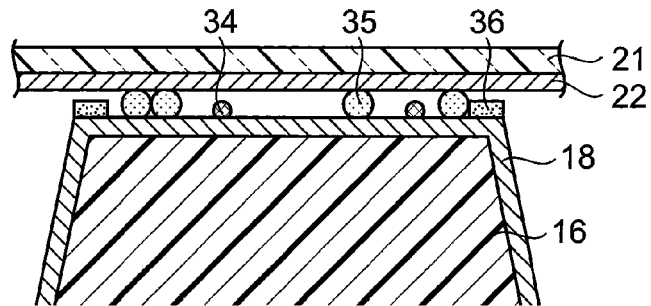
FIGS. 13A, 13B, 13C and 13D are main structure cross-sectional diagrams (No. 1) showing other structural example of the display apparatus according to the first embodiment.

In a structural example of the display apparatus shown in FIG. 13A, an insulative film 36 is projected and extended along edge portions of the upper surface part of the partition wall layer 16 of the display panel 110. Further, the opposite electrode 18 of the display panel 110 and the transparent resistive film 22 of the plane coordinate circuit 210 are disposed so as to face each other by having a predetermined space therebetween via conductive particles 34 and insulative particles 35 having different particle diameters at the upper surface part of the partition wall layer 16 surrounded by the insulative film 36. Here, for the insulative particles 35, particles having a particle diameter larger than the conductive particles 34 are applied, and the insulative particles 35 function as spacers to maintain a space between the opposite electrode 18 and the transparent resistive film 22. Further, for the conductive particles 34, particles having a particle diameter so that the transparent resistive film 22 contacts the conductive particles 34 when the transparent resistive film 22 is deflected and the space maintained by the insulative particles 35 is pushed by a user pushing the insulative substrate 21 of the position detection module 200 (plane coordinate circuit 210) are applied.

The insulative film 36 in the structural example is formed by forming an insulative film of a predetermined film thickness on the display panel 110 in which the opposite electrode 18 is formed and by carrying out a patterning so that the insulative film 36 remains along the edge portions in the upper surface part of the partition wall layer 16, for example. Further, the conductive particles 34 and the insulative particles 35 can be disposed or attached locally on the upper surface part of the partition wall layer 16 surrounded by the insulative film 36 by a spraying method using a mask, for example. Here, the conductive particles 34 and the insulative particles 35 are roughly disposed, and can be sprayed throughout the entire area of the display panel 110 when effect to the light Lem which is emitted from the organic EL layer 17 can be substantially ignored.

Figure 13B:
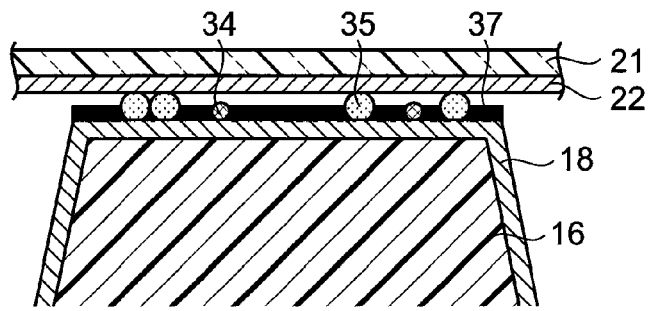

In a structural example of the display apparatus shown in FIG. 13B, a particle protective layer 37 formed of a UV curable resin or the like, for example, is provided at the upper surface part of the partition wall layer 16 of the display panel 110. Further, at the upper surface part of the partition wall layer 16, the opposite electrode 18 of the display panel 110 and the transparent resistive film 22 of the plane coordinate circuit 210 are disposed so as to face each other having a predetermined space therebetween via the conductive particles 34 and the insulative particles 35 if different particle diameters which are held by the particle protective layer 37.

In the display panel 110 in which the opposite electrode 18 is formed, for example, the particle protective layer 37 of the structural example is formed by carrying out a film coating of the UV curable resin at a predetermined thickness to the upper surface part of the partition wall layer 16 by using a coating method by a dispenser or a printing method by a nozzle printer or the like. Then, after the conductive particles 34 and the insulative particles 35 are sprayed to the UV curable resin which is coated on the upper surface part of the partition wall layer 16, the conductive particles 34 and the insulative particles 35 are held at the upper surface part of the partition wall layer 16 by irradiating ultraviolet light to cure the UV curable resin.

Figure 13C:
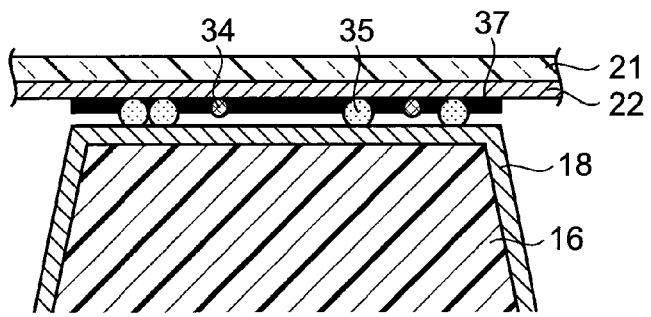

Here, in the structural example, a structure where the UV curable resin is coated on the upper surface part of the partition wall layer 16 to hold the conductive particles 34 and the insulative particles 35. However, the present invention is not limited to this structure, and for example, as shown in FIG. 13C, the UV curable resin may be coated to a region corresponding to the partition wall layer 16 in the transparent resistive film 22 of the plane coordinate circuit 210 to hold the conductive particles 34 and the insulative particles 35.

Figure 13D:
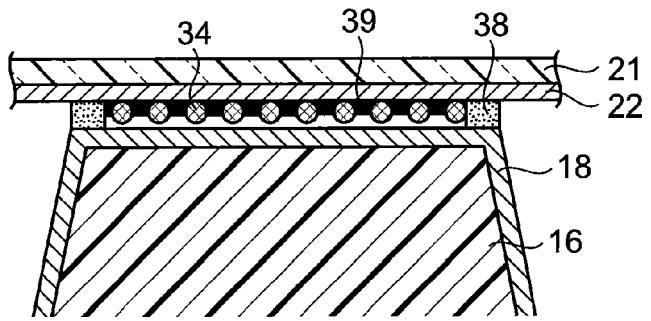

In a structural example of the display apparatus shown in FIG. 13D, an insulative film 38 which functions as a spacer to maintain a spacer between the opposite electrode 18 and the transparent resistive film 22 are provided along edge portions of the upper surface part of the partition wall layer 16 of the display panel 110. Further, in a region surrounded by the insulative film 38 of the transparent resistive film 22, a conductive layer 39 formed of a conductive paste in which the conductive particles 34 are held is provided. Here, film thickness of the insulative film 38 is set so as to be greater than the particle diameter of the conductive particles 34.

The insulative film 38 in the structural example is formed by forming an insulative film of a predetermined film thickness on the transparent resistive film 22 of the plane coordinate circuit 210 and by carrying out a patterning so that the insulative film 38 remains in regions corresponding to the edge portions on the upper surface part of the partition wall layer 16, for example. Further, the conductive layer 39 is formed by coating the conductive paste in a predetermined thickness to the region surrounded by the insulative film 38 of the transparent resistive film 22 by using the coating method by a dispenser or the printing method by a nozzle printer or the like. Then, after the conductive particles 34 are sprayed to the conductive paste which is applied on the transparent resistive film 22, the conductive particles 34 are held at the conductive layer 39 corresponding to the upper surface part of the partition wall layer 16 by the conductive paste being dried and solidified.

Here, in the structural example, a structure where the insulative film 38 which functions as the spacer is provided along edge portions in the upper surface part of the partition wall layer 16 and where the conductive particles 34 which are held in the conductive layer 39 are disposed inside the insulative film 38 is shown. However, the present invention is not limited to this structure, and for example, as shown in FIG. 14A, only the insulative film 38 may be provided along the edge portions in the upper surface part of the partition wall layer 16, and the opposite electrode 18 of the display panel 110 and the transparent resistive film 22 of the plane coordinate circuit 210 may be disposed so as to face each other by having a predetermined space whish is defined by the film thickness of the insulative film 38 therebetween.

Figure 14A:
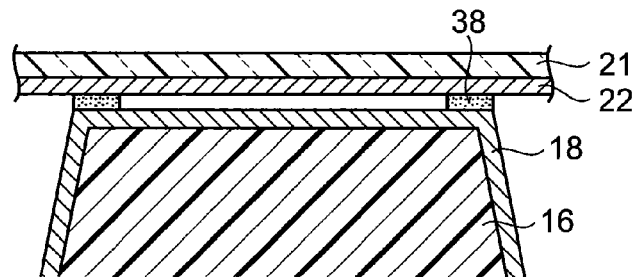
FIGS. 14A, 14B, 14C and 14D are main structure cross-sectional diagrams (No. 2) showing other structural example of the display apparatus according to the first embodiment.
Figure 14B:
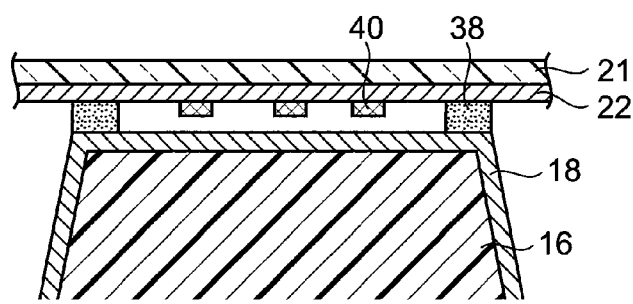
Figure 14C:
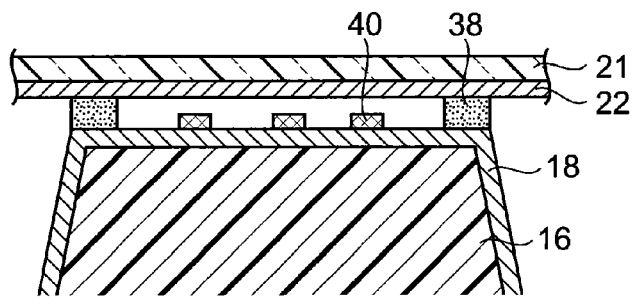

Moreover, as shown in FIG. 14B, a structure where a conductive layer 40 to which an etching can be selectively carried out is provided on a surface of the transparent resistive film 22 in the region surrounded by the insulative film 38 which are provided along the edge portions of the upper surface part of the partition wall layer 16 or a structure where a plurality of the conductive layers 40 are locally print-formed on a surface of the transparent resistive film 22 in the region surrounded by the insulative film 38 which are provided along the edge portions of the upper surface part of the partition wall layer 16 may be applied to the structural example shown in FIG. 14A. Further, a structure where a plurality of projecting portions are provided by directly patterning the surface of the transparent resistive film 22 or by forming the transparent resistive film 22 after forming a plurality of concavo-convex patterns on the surface of the insulative substrate 21 may be applied. The plurality of conductive layers 40 and the plurality of projecting portions of the transparent resistive film 22 form a plurality of conductive projection portions Moreover, as shown in FIG. 14C, a structure where the conductive layer 40 having a predetermined film thickness is provided in the upper surface part of the partition wall layer 16 in a region surrounded by the insulative film 38 which are provided along the edge portions of the upper surface part of the partition wall layer 16 by using a dry-etching method may be applied to the structural example shown in FIG. 14A, for example. Here, similarly to the above described particle diameter of the conductive particles 34, film thickness of the conductive layer 40 is formed so as to have a film thickness so that the conductive layer 40 contact the opposite electrode 18 or the transparent resistive film 22 when the space which is maintained by the insulative film 39 is pushed by the transparent resistive film 22 being deflected by a user pushing the insulative substrate 21 of the position detection module 200 (plane coordinate circuit 210).

Figure 14D:
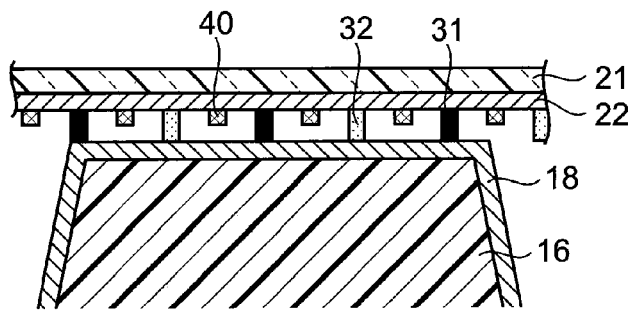

Here, in the above described first embodiment, a structure where the opposite electrode 18 and the transparent resistive film 22 are disposed so as to face each other via the adhesive agent 31 and the spacer 32 as shown in FIG. 5. However, the present invention is not limited to this structure, and for example, a structure where the conductive layer 40 having a predetermined film thickness which projects from the surface of the transparent resistive film 22 or the opposite electrode 18 is provided in the space between the opposite electrode 18 and the transparent resistive film 22, the space being maintained by the spacer 32, as shown in FIG. 14D can be applied.

Second Embodiment

Next, the second embodiment of the display apparatus according to the present invention will be described.

FIG. 15 is a schematic diagram showing the second embodiment of the display apparatus according to the present invention.

Figure 16:
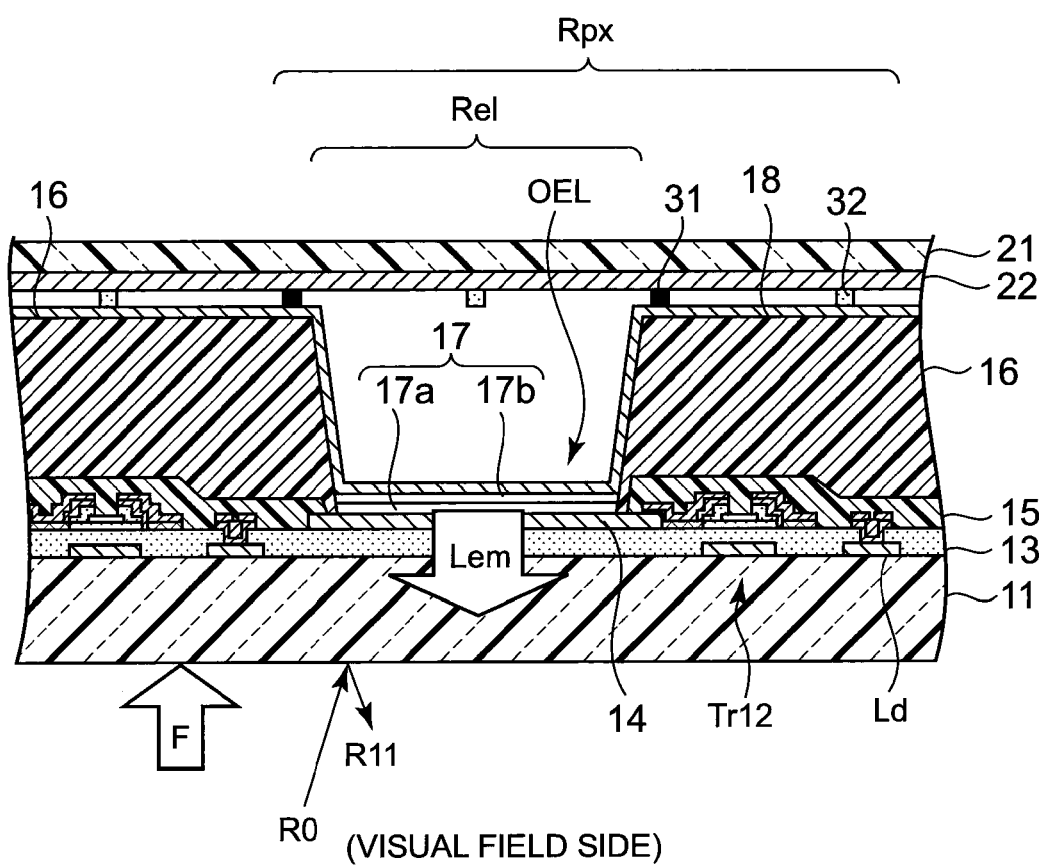
FIG. 16 is a main structure cross-sectional diagram of the display apparatus according to the embodiment.

FIG. 16 is a main structure cross-sectional diagram of the display apparatus according to the embodiment. Here, same symbols are used for structures which are similar to the structures of the above described first embodiment and descriptions are simplified. In FIG. 15, in order to clarify the arrangement between the display panel module and the position detection module, hatching is carried out for descriptive purposes.

In the above described first embodiment, a case where the plane coordinate circuit 210 of the position detection module 200 is disposed in a visual field side of the display panel 110 and where having a light emitting structure of a top emission type in which a light emitted in each display pixel PIX (organic EL element OEL) of the display panel 110 is output in the visual field side via the plane coordinate circuit 210 as shown in FIGS. 1 and 5 is described.

In the second embodiment, the plane coordinate circuit 210 of the position detection module 200 is disposed in the back side (non-visual field side) of the display panel 110 as shown in FIGS. 15 and 16, and the second embodiment has a light emitting structure of a bottom emission type in which a light emitted in each display pixel PIX (organic EL element OEL) of the display panel 110 is output in the visual field side via the insulative substrate 11 of the display panel 110 without passing through the plane coordinate circuit 210.

That is, in the embodiment, the opposite electrode 18 of the organic EL element OEL includes a metal material having a light reflecting characteristic. Further, the metal layer 12 which is provided in the first embodiment is not formed in the lower layer (insulative substrate 11 side) of the pixel electrode 14 of the organic EL element OEL. In such way, the light emitted in the organic EL layer 17 of the organic EL element OEL is outputted (arrow Lem) in the visual field side (lower side in the diagram) via the pixel electrode 14, the gate insulative film 13 and the insulative substrate 11 directly or by being reflected by the opposite electrode 18 of the upper layer as shown in FIG. 16. Here, the display panel 110 has a thin film structure, for example, and is structured so as to have flexibility with respect to a pressure from outside.

In the display apparatus having such structure as described above, when a user carries out a desired input operation by visually recognizing the image information displayed in the display panel 110, an arbitrary position such as an arrow F in the diagram is pushed from the other side (lower surface side in the diagram) of the insulative substrate 11 of the display panel 110 as shown in FIG. 16. In such way, the display panel 110 deflects and the space which is maintained by the spacer 32 is pushed, and the opposite electrode 18 contacts the transparent resistive film 22 of the plane coordinate circuit 210. By detecting a voltage of the opposite electrode 18 at this time, the pushed position which is pushed by a user is calculated. Then, the display state is reflected to the image corresponding to the pushed position by highlighting or the like, for example, and the pushed position can be made to be recognized by a user.

Therefore, similarly to the above described first embodiment, the opposite electrode 18 of the display panel 110 is also double used as the voltage detection electrode and the display panel and the touch panel are also integrally structured in the display apparatus according to the embodiment. Thus, the manufacturing cost can be reduced, and also, mounting footprints and thickness of the display apparatus can be reduced. Specifically, because the embodiment has a light emitting structure of a bottom emission type, there is no need to use a transparent electrode material which is comparatively expensive such as ITO or the like for the opposite electrode 18 and the transparent resistive film 22 and an inexpensive metallic material can be used.

Here, the display apparatus according to the embodiment has a structure in which the plane coordinate circuit 210 of the position detection module 200 is disposed in a back side of the display panel 110. Therefore, when the display panel 110 does not have sufficient flexibility with respect to a pressure from outside, there is a possibility that the detection accuracy of the pushed position becomes low. In such case, by applying a structure in which the conductive particles are disposed in the space between the opposite electrode 18 and the transparent resistive film 22 or by applying a structure in which projecting conductive layer and electrode layer are provided in the space between the opposite electrode 18 and the transparent resistive film 22 as shown in FIG. 13 and FIGS. 14B to 14D, the detection accuracy of the pushed position can be improved.

Moreover, because the display apparatus according to the embodiment has a light emitting structure of a bottom emission type, the interface in which the light R0 entered from outside of the display apparatus is reflected in a visual field direction is practically only a surface of the insulative substrate 11 of the display panel 110, as shown in FIG. 16. Further, the number of layers in which the light passes through until the light Lem emitted in the organic EL element OEL is visually recognized by a user is small. Therefore, in the embodiment, the problem of the contrast being reduced due to the reflection light R11 or attenuation of the light Lem is not significant comparing to a light emitting structure of a top emission type.

The entire disclosure of Japanese Patent Application No. 2009-081043 filed on Mar. 30, 2009 including descriptions, claims, drawings, and abstracts are incorporated herein by reference in its entirety.

What is claimed is:

1. A display apparatus, comprising:
   a display panel which comprises a plurality of display pixels and a partition wall layer, wherein the plurality of display pixels are arranged in a two-dimensional array on a first surface side of a first substrate, wherein the plurality of display pixels are formed of (i) a plurality of first electrodes provided on the first surface side of the first substrate, (ii) a second electrode having a first surface side which faces each of the first electrodes, and (iii) display functional layers which are provided between the first electrodes and the second electrode in a plurality of pixel forming regions provided on the first surface side of the first substrate, and wherein the partition wall layer is disposed to define the plurality of pixel forming regions of the plurality of display pixels, and top parts of the partition wall layer protrude farther from the first surface side of the first substrate than the display functional layers of the display pixels; and
   a resistive film which has a predetermined resistivity and which is provided so that a first surface side thereof faces a second surface side of the second electrode,
   wherein the second electrode covers the top parts of the partition wall layer, and the second surface side of the second electrode is exposed, and
   wherein the resistive film is provided so as to face the second surface side of the second electrode via a predetermined space above the top parts of the partition wall layer, and is disposed so as to be conductive to the second surface side of the second electrode at the top parts of the partition wall layer by a pressure applied from outside.

2. The display apparatus according to claim 1, further comprising:
   a voltage applying circuit to form a voltage gradient in a first direction of the resistive film and a voltage gradient in a second direction orthogonal to the first direction of the resistive film in the resistive film, and
   a position detection circuit to detect a position where the resistive film is conductive to the second electrode based on a first voltage value and a second voltage value,
   wherein the first voltage value is a voltage which is detected from the second electrode when the voltage gradient in the first direction of the resistive film is being formed by the voltage applying circuit and the second voltage value is a voltage which is detected from the second electrode when the voltage gradient in the second direction of the resistive film is being formed by the voltage applying circuit, when the second electrode and the resistive film are conductive due to the pressure.

3. The display apparatus according to claim 1, further comprising a switching circuit connected to the second electrode,
   wherein the switching circuit connects the second electrode to the position detection circuit when in an operation mode to detect the position where the pressure is applied, and the switching circuit connects the second electrode to a voltage source which applies a voltage to drive the plurality of display pixels when in an operation mode to carry out an image display in the display panel.

4. The display apparatus according to claim 1, further comprising a second substrate, the resistive film being provided on a first surface side of the second substrate,
   wherein the second substrate and the resistive film are flexible, and
   wherein when the pressure is applied to a second surface side of the second substrate, the resistive film and the second electrode become conductive by the second substrate and the resistive film deflecting due to the pressure.

5. The display apparatus according to claim 1, wherein:
   the display panel is flexible, and
   when the pressure is applied to a second surface side of the first substrate, the resistive film and the second electrode become conductive by the display panel deflecting due to the pressure.

6. The display apparatus according to claim 1, further comprising a spacer to maintain the space between the second surface side of the second electrode and the first surface side of the resistive film.

7. The display apparatus according to claim 1, further comprising:
a plurality of conductive projection portions provided between the second surface side of the second electrode and the first surface side of the resistive film, the conductive projection portions projecting from either one of the second surface side of the second electrode or the first surface side of the resistive film, and
a height of the projection portions is smaller than the space.

8. The display apparatus according to claim 1, wherein a conductive particle having a particle diameter smaller than the space is provided between the second surface side of the second electrode and the first surface side of the resistive film.

9. The display apparatus according to claim 1, wherein the display pixels comprise light emitting elements, and the display functional layers are light emitting functional layers.

10. The display apparatus according to claim 9, wherein the light emitting elements are organic electroluminescence elements.

11. A display apparatus, comprising:
a display panel which comprises a plurality of display pixels and a partition wall layer, wherein the plurality of display pixels are arranged in a two-dimensional array on a first surface side of a first substrate, wherein the plurality of display pixels are formed of (i) a plurality of first electrodes provided on the first surface side of the first substrate, (ii) a second electrode having a first surface side which faces each of the first electrodes, and (iii) display functional layers which are provided between the first electrodes and the second electrode in a plurality of pixel forming regions provided on the first surface side of the first substrate, wherein the partition wall layer is disposed to define the plurality of pixel forming regions of the plurality of display pixels, and top parts of the partition wall layer protrude farther from the first surface side of the first substrate than the display functional layers of the display pixels, and wherein the second electrode covers the top parts of the partition wall layer, and a second surface side of the second electrode is exposed;
a resistive film which has a predetermined resistivity, and which is provided so that a first surface side thereof faces the second surface side of the second electrode via a predetermined space above top parts of the partition wall layer, wherein the resistive film is disposed so as to be conductive to the second surface side of the second electrode at the top parts of the partition wall layer by a pressure applied from outside;
a voltage applying circuit to form a voltage gradient in a first direction of the resistive film and a voltage gradient in a second direction orthogonal to the first direction of the resistive film;
a position detection circuit to detect a position where the resistive film is conductive to the second electrode based on a voltage value of a voltage detected from the second electrode when the resistive film is conductive to the second electrode; and
a switching circuit to connect the second electrode to the position detection circuit when in an operation mode to detect the position where the pressure is applied, and to connect the second electrode to a voltage source for applying a voltage to drive the plurality of display pixels when in an operation mode to carry out an image display in the display panel.

12. The display apparatus according to claim 11, further comprising a second substrate, the resistive film being provided on a first surface side of the second substrate,
wherein:
the second substrate and the resistive film are flexible, and
when the pressure is applied to a second surface side of the second substrate, the resistive film and the second electrode become conductive by the second substrate and the resistive film deflecting due to the pressure.

13. The display apparatus according to claim 11, wherein:
the display panel is flexible, and
when the pressure is applied to a second surface side of the first substrate, the resistive film and the second electrode become conductive by the display panel deflecting due to the pressure.

14. A drive control method of a display apparatus which comprises: (A) a display panel which comprises a plurality of display pixels and a partition wall layer, wherein the plurality of display pixels are arranged in a two-dimensional array on a first surface side of a first substrate, wherein the plurality of display pixels are formed of (i) a plurality of first electrodes provided on the first surface side of the first substrate, (ii) a second electrode having a first surface side which faces each of the first electrodes, and (iii) display functional layers which are provided between the first electrodes and the second electrode in a plurality of pixel forming regions provided on the first surface side of the first substrate, wherein the partition wall layer is disposed to define the plurality of pixel forming regions of the plurality of display pixels, and top parts of the partition wall layer protrude farther from the first surface side of the first substrate than the display functional layers of the display pixels, and wherein the second electrode covers the top parts of the partition wall layer, and a second surface side of the second electrode is exposed; and (B) a resistive film which has a predetermined resistivity, and which is provided so that a first surface side thereof faces the second surface side of the second electrode via a predetermined space above the top parts of the partition wall layer, wherein the resistive film is disposed so as to be conductive to the second surface side of the second electrode at the top parts of the partition wall layer by a pressure applied from outside, the method comprising:
writing display data in the plurality of display pixels of the display panel by connecting the second electrode to a voltage source for applying a voltage to drive the plurality of display pixels, in a writing operation period which is a part of a certain operation period;
displaying an image according to the display data in the display panel by connecting the second electrode to the voltage source for applying the voltage to drive the plurality of display pixels, in a display operation period which is a part of the operation period; and
detecting a position where the resistive film is conductive to the second electrode based on a voltage value of a voltage which is detected from the second electrode when the second electrode and the resistive film become conductive due to applied pressure by shutting off the second electrode from the voltage source and by forming a voltage gradient in a predetermined direction in the resistive film, in a position detection operation period which is a part of the operation period.

15. A manufacturing method of a display apparatus having a plurality of display pixels, comprising:
- forming a plurality of first electrodes on a first surface side of a substrate;
- forming a partition wall layer for defining a plurality of pixel forming regions of the plurality of display pixels on the first surface side of the substrate;
- forming display functional layers on upper surfaces of the first electrodes in the plurality of pixel forming regions of the display pixels;
- forming a second electrode so that a first surface side of the second electrode faces each of the first electrodes via the display functional layers in the plurality of pixel forming regions of the display pixels;
- forming a display panel having the plurality of display pixels which are formed of the plurality of first electrodes, the display functional layers, and the second electrode; and
- providing a resistive film having a predetermined resistivity so that a first surface side of the resistive film faces a second surface side of the second electrode of the display panel via a predetermined space above top parts of the partition wall layer, the resistive film being disposed so as to be conductive to the second surface side of the second electrode due to a pressure being applied from outside, wherein:
- in the forming of the partition wall layer, the top parts of the partition wall layer are formed so as to protrude farther from the first surface side of the substrate than the display function layers of the display pixels,
- in the forming of the second electrode, the second electrode is formed so as to cover the top parts of the partition wall layer, and so that the second surface side of the second electrode is exposed, and
- in the providing of the resistive film, the resistive film is disposed so that the resistive film contacts the second surface side of the second electrode at the top parts of the partition layer due to the pressure applied from outside.

* * * * *